US012801453B2

(12) United States Patent
Bhujanga et al.

(10) Patent No.: US 12,801,453 B2
(45) Date of Patent: Nov. 17, 2026

(54) METHODS AND APPARATUS FOR AGGREGATING METADATA OF MULTIPLE CLOUD DATABASES

(71) Applicant: Walmart Apollo, LLC, Bentonville, AR (US)

(72) Inventors: Giridhar Manchenahalli Bhujanga, Sunnyvale, CA (US); Stan Schwarz, Spokane Valley, WA (US); Sukesh Behera, San Jose, CA (US); Gerald Bothello, Foster City, CA (US)

(73) Assignee: Walmart Apollo, LLC, Bentonville, AR (US)

(*) Notice: Subject to any disclaimer, the term of this patent is extended or adjusted under 35 U.S.C. 154(b) by 687 days.

(21) Appl. No.: 17/737,698

(22) Filed: May 5, 2022

(65) Prior Publication Data

US 2023/0359506 A1 Nov. 9, 2023

(51) Int. Cl.

| | |
|---|---|
| ***G06F 16/245*** | (2019.01) |
| ***G06F 9/455*** | (2018.01) |
| ***G06F 9/50*** | (2006.01) |
| ***G06F 16/23*** | (2019.01) |
| ***G06F 16/2455*** | (2019.01) |

(52) U.S. Cl.

CPC ........ *G06F 9/5072* (2013.01); *G06F 9/45558* (2013.01); *G06F 16/2379* (2019.01); *G06F 16/2455* (2019.01); *G06F 2009/4557* (2013.01); *G06F 2009/45583* (2013.01)

(58) Field of Classification Search

CPC ......................... G06F 16/2379; G06F 16/2455

See application file for complete search history.

(56) References Cited

U.S. PATENT DOCUMENTS

| | | | |
|---|---|---|---|
| 7,239,629 B1 | 7/2007 | Olshansky et al. | |
| 9,251,114 B1 * | 2/2016 | Ancin | G06F 16/122 |
| 10,536,355 B1 | 1/2020 | Cao et al. | |
| 11,138,175 B2 | 10/2021 | Arye et al. | |
| 11,528,212 B1 * | 12/2022 | Allie | H04L 67/133 |
| 2008/0154850 A1 | 6/2008 | Evans | |
| 2012/0105909 A1 | 5/2012 | Kano | |
| 2013/0136126 A1 | 5/2013 | Wang et al. | |
| 2014/0164449 A1 * | 6/2014 | Kim | G06F 9/5005 707/827 |
| 2016/0164753 A1 | 6/2016 | Cimprich et al. | |
| 2016/0198003 A1 | 7/2016 | Luft | |
| 2016/0292193 A1 * | 10/2016 | Madanapalli | G06F 21/6218 |

(Continued)

*Primary Examiner* — Alicia M Willoughby

(74) *Attorney, Agent, or Firm* — Morgan, Lewis & Bockius LLP; Manita Rawat

(57) ABSTRACT

In some examples, a system may be configured to identify at least a first cloud database system of a plurality of cloud database systems and a second cloud database system of the plurality of cloud database systems. Additionally, the system may be configured to create at least a first namespace and a second namespace within the aggregated metadata database. Moreover, the system may be configured to obtain, from the first cloud database system, and store, to the first namespace, a first set of metadata, and obtain, from the second cloud database system, and store, to the second namespace, a second set of metadata. Further, the system may be configured to associate one or more attributes to the first set of metadata and one or more attributes to the second set of metadata.

20 Claims, 7 Drawing Sheets

(56) References Cited

U.S. PATENT DOCUMENTS

| | | | |
|---|---|---|---|
| 2019/0235909 A1 | 8/2019 | Jin et al. | |
| 2019/0238590 A1* | 8/2019 | Talukdar | G06F 3/0631 |
| 2019/0325155 A1* | 10/2019 | Wu | G06F 21/64 |
| 2020/0142813 A1* | 5/2020 | Schaude | G06F 11/3688 |
| 2020/0236141 A1* | 7/2020 | Punadikar | G06F 21/6209 |
| 2021/0342342 A1* | 11/2021 | Crofton | G06F 21/6227 |
| 2021/0365438 A1* | 11/2021 | Carru | G06F 16/2379 |
| 2021/0374146 A1 | 12/2021 | Hrastnik | |
| 2022/0114163 A1* | 4/2022 | Seetharaman | G06F 16/2379 |
| 2022/0229848 A1* | 7/2022 | Testardi | G06F 3/0619 |

* cited by examiner

METHODS AND APPARATUS FOR AGGREGATING METADATA OF MULTIPLE CLOUD DATABASES

TECHNICAL FIELD

The disclosure relates to methods and apparatuses for managing and aggregating metadata of multiple cloud databases.

BACKGROUNDS

In various examples, an entity, such as an e-commerce entity, may utilize a cloud database system. The cloud database system may be powered by multiple servers/databases and may include a number of cloud entities (e.g., virtual machines, hypervisors, subnets, volumes, assigned IPs, projects, etc.). In such examples, a computing device of an administrator managing the cloud database system may obtain metadata generated by the cloud database system. Further, the computing device may perform various levels of analysis and make various levels of determinations related to the cloud database system based on such metadata. Conventionally, the computing device may obtain such metadata may include querying the relevant metadata APIs and issuing numerous requests and application programming interface (API) calls to the relevant metadata APIs or querying the relevant databases of the cloud database system and issuing numerous requests and calls to the relevant databases of the cloud database system. Given that the number of cloud entities may be in the thousands, such conventional processes, by the computing device, may require an extensive amount of computing resources and/or time to obtain such metadata and place an extensive load onto the cloud database system, each time the computing device performs the various levels of analysis and determinations related to the cloud database system. Further, given that a particular entity may utilize multiple cloud database systems, such requirements and loads may be exacerbated, each time the computing device performs the various levels of analysis and determinations related to the cloud database system.

SUMMARY

The embodiments described herein are directed to a computing system that aggregates relevant metadata from multiple cloud database systems within an aggregated database. In various examples, the computing system may refer to the aggregated database when querying metadata of particular entities of one or more of the multiple cloud database systems instead of querying each database or the relevant metadata API of one or more of multiple cloud database systems. That way, the load onto the computing system and the required amount of computing resources and time to make such queries is drastically reduced.

Further, for each query, the computing system may generate a data object of the results associated with the corresponding query. Such data objects may be stored in a cache or cache-like system. That way, for any subsequent queries, the computing system may refer to the cache or cache-like system to determine whether a similar query has already been made, and if it has, pull from the cache or cache-like system the data object associated with such a query. As such, the load onto the computing system and the required amount of computing resources and time to make such queries is drastically reduced.

In accordance with some embodiments, exemplary computing systems may be implemented in any suitable hardware or hardware and software, such as in any suitable computing device. In some embodiments, a system may include a memory resource storing instructions and at least a processor communicatively coupled to the memory resource. In various examples, the processor may be configured to execute the instructions to identify at least a first cloud database system of a plurality of cloud database systems and a second cloud database system of the plurality of cloud database systems. Additionally, the processor may be configured to execute the instructions to, create at least a first namespace and a second namespace within the aggregated database. Moreover, the processor may be configured to execute the instructions to, obtain, from the first cloud database system, and store, to the first namespace, a first set of metadata, and obtain, from the second cloud database system, and store, to the second namespace, a second set of metadata. Further, the processor may be configured to execute the instructions to, associate one or more attributes to the first set of metadata and one or more attributes to the second set of metadata.

In other embodiments, a computer-implemented method is provided that includes identifying at least a first cloud database system of a plurality of cloud database systems and a second cloud database system of the plurality of cloud database systems. Additionally, the computer-implemented method includes, creating at least a first namespace and a second namespace within the aggregated database. Moreover, the computer-implemented method includes, obtaining, from the first cloud database system, and store, to the first namespace, a first set of metadata, and obtaining, from the second cloud database system, and store, to the second namespace, a second set of metadata. Further, the computer-implemented method includes associating one or more attributes to the first set of metadata and one or more attributes to the second set of metadata.

In various embodiments, a non-transitory computer readable medium has instructions stored thereon, where the instructions, when executed by the at least one or more processors, cause a computing system to, identify at least a first cloud database system of a plurality of cloud database systems and a second cloud database system of the plurality of cloud database systems. Additionally, the processor may be configured to execute the instructions to create at least a first namespace and a second namespace within the aggregated database. Moreover, the at least one or more processors may be configured to execute the instructions to cause the computing system to, obtain, from the first cloud database system, and store, to the first namespace, a first set of metadata, and obtain, from the second cloud database system, and store, to the second namespace, a second set of metadata. Further, the at least one or more processors may be configured to execute the instructions to cause the computing system to, associate one or more attributes to the first set of metadata and one or more attributes to the second set of metadata.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
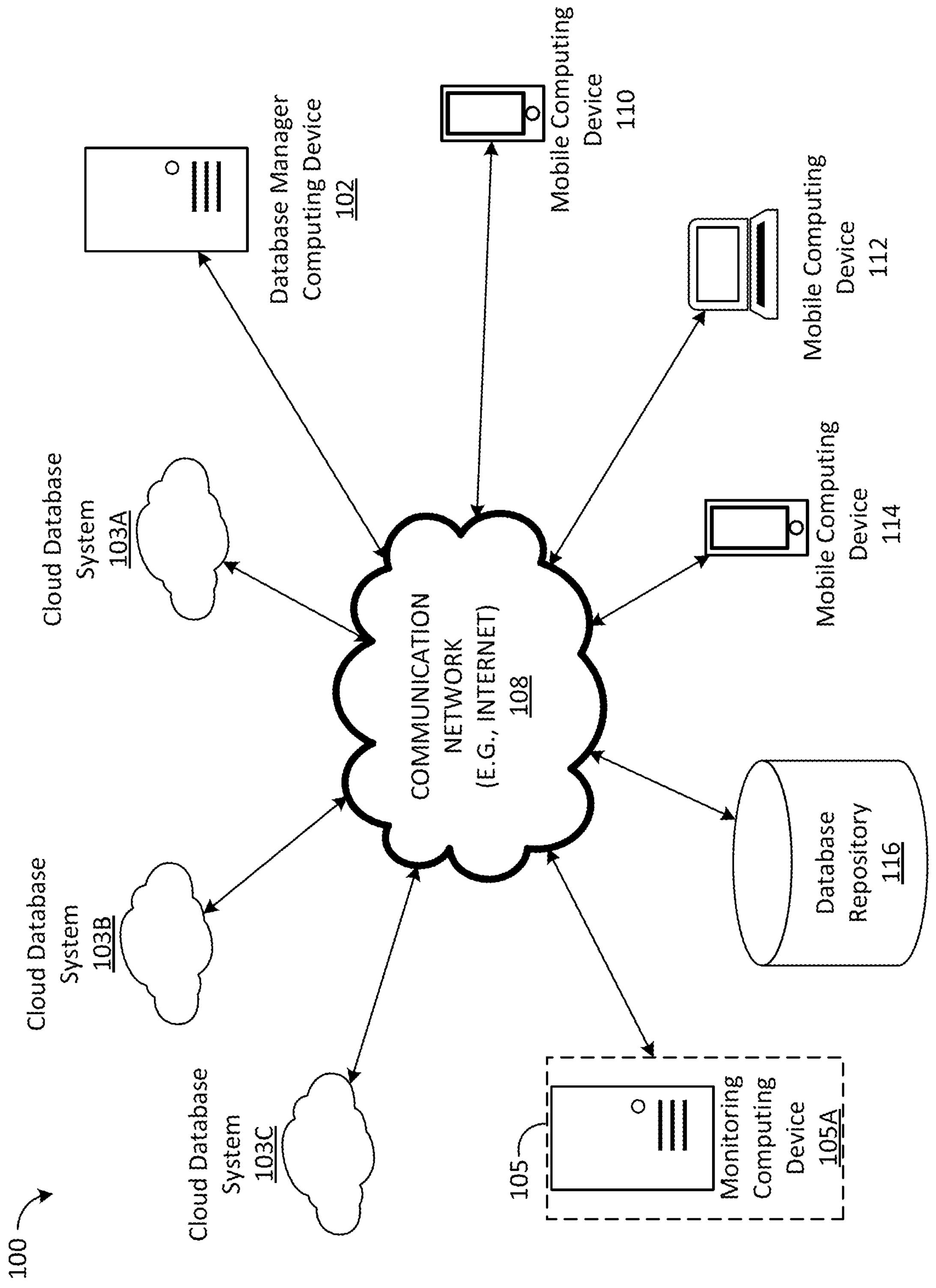
FIG. 1 is a block diagram of an example cloud computing system that includes a database manager computing device 102.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms “couple,” “coupled,” “operatively coupled,” “operatively connected,” and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

FIG. 1 illustrates a block diagram of an example cloud computing system 100 that includes database manager computing device 102 (e.g., a server, such as an application server), multiple cloud database systems 103A, 103B, 103C, monitoring computing system 105 including monitoring computing device 105A, data repository 116 and multiple mobile computing devices 110, 112, 114, operatively coupled over communication network 108. Database manager computing device 102, multiple cloud database systems 103A, 103B, 103C, monitoring computing device 105A of monitoring computing system 105, and multiple mobile computing devices 110, 112, 114 may each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 108.

In some examples, database manager computing device 102 can be a computer, a workstation, a laptop, a server such as a cloud-based server, or any other suitable device. In other examples, each of the multiple cloud database systems 103A, 103B, 103C may be powered by one or more servers or databases. Additionally, each of the multiple cloud database systems 103A, 103B, 103C may include a number of cloud entities (e.g., virtual machines, hypervisors, subnets, volumes, assigned IPs, projects, etc.). Further, one or more of the cloud database systems may support and maintain one or more software applications or applications that may be executed on one or more of mobile computing devices (e.g., mobile computing device 110, 112, 114). In some examples the cloud database systems, such as cloud database systems 103A, 103B, 103C may be configured to be private or public. Although FIG. 1 illustrates three cloud database systems 103A, 103B, and 103C, cloud computing system 100 can include any number of cloud database systems. Similarly, cloud computing system 100 can include any number of database manager computing device 102, monitoring computing system 105, and data repository 116.

In some examples, each of multiple mobile computing devices 110, 112, and 114 can be a cellular phone, a smart phone, a tablet, a personal assistant device, a voice assistant device, a digital assistant, a laptop, a computer, or any other suitable device. In some examples, database manager computing device 102 is operated by an operator or analyst of cloud computing system 100. In some instances, an analyst or operator may operate one or more of the multiple mobile computing devices 110, 112, and 114. Although FIG. 1 illustrates three mobile computing devices 110, 112, and 114, cloud computing system 100 can include any number of mobile computing devices 110, 112, 114.

In some examples, database manager computing device 102 may implement operations that obtain and store metadata of one or more of the multiple cloud database systems 103A, 103B, 103C into data repository 116. In various examples, database manager computing device 102 may utilize a library to identify cloud database systems (e.g., cloud database systems 103A, 103B, 103C) to communicate with, such as a foreign data wrapper (FDW), to obtain and store the metadata of one or more of the multiple cloud database systems into data repository 116. In some examples, an operator or analyst operating database manager computing device 102 may instruct database manager computing device 102 to obtain metadata of one or more entities of one or more cloud database systems and/or metadata of one or more applications that are supported and maintained by one or more cloud database systems (e.g., metadata of one or more entities of the one or more cloud database systems that support and maintain the one or more applications). In such examples, the instructions may cause database manager computing device 102 to obtain and store the relevant data into data repository 116.

In examples where the cloud database system, such as cloud database systems 103A, 103B, 103C, is configured to be public, database manager computing device 102 may interrogate the relevant metadata APIs to obtain the relevant meta data. For example, for a particular virtual machine of cloud database system 103A, database manager computing device 102 may directly submit metadata requests for the particular virtual machine to the relevant metadata APIs associated with the particular virtual machine. In response to the request, database manager computing device 102 may obtain from each of the relevant metadata APIs the requested metadata and store the requested metadata in data repository 116.

In examples where the cloud database system, such as cloud database systems 103A, 103B, 103C, is configured to be private, database manager computing device 102 may obtain the relevant metadata from the cloud database system using credentials (e.g., user name and password). For example, for a particular virtual machine of cloud database system 103B, database manager computing device 102 may obtain the credentials to access database manager computing device 102. Additionally, for a particular virtual machine, database manager computing device 102 may utilize the credentials to access cloud database system 103B and obtain metadata associated with the particular virtual machine. Further, database manager computing device 102 may store the metadata associated with the particular virtual machine in data repository 116.

Additionally, the metadata may be associated with a particular entity (e.g., virtual machines, hypervisors, subnets, volumes, assigned IPs, projects, etc.) of a particular cloud database system of the multiple cloud database systems 103A, 103B, 103C. In some instances, the data of each of the multiple cloud database systems 103A, 103B and 103C may be organized or structured identically or very similarly. To avoid collision of identically named metadata originating from different cloud database systems, database manager computing device 102 may generate or create a uniquely identified namespace for each of the multiple cloud database systems 103A, 103B, 103C that metadata is being pulled from and stored into the data repository 116. As such, database manager computing device 102 may store or place the metadata of a particular cloud database system into the corresponding designated namespace associated with the particular cloud database system the metadata originated from.

In other examples, the metadata of a particular entity may include information related to the particular entity. For example, the metadata of the particular entity may include one or more data elements identifying and characterizing the particular entity. Examples of the one or more data elements include at least the name of the corresponding entity, unique identifier of the entity, time and/or date of creation, time and/or date of latest update, power state, entity state, host name, owner identifier, name of related entity the corresponding entity may be running on or being supported/maintained by (e.g., name of hypervisor that the corresponding entity, a virtual machine, is running off of).

In some instances, the metadata stored within each namespace may be in a tabular format. Additionally, each row may identify a particular entity, and each column of each row may be associated with a particular data element. Examples of the one or more data elements include unique identifier of the entity, time and/or date of creation, time and/or date of latest update, power state, entity state, host name, owner identifier, name of related entity the corresponding entity may be running on or being supported/maintained by (e.g., name of hypervisor that the corresponding entity, a virtual machine, is running off of).

Further, the metadata of one or more of the multiple cloud database systems 103A, 103B, 103C stored in data repository 116 may be assigned or associated with one or more attributes, on the fly. For example, while the metadata of cloud database system 103A is being obtained and stored into a namespace associated with cloud database system 103A, database manager computing device 102 may assign or associate one or more attributes to the metadata. Examples of the one or more attributes include an identifier of the namespace that the metadata is being stored or placed into and information related to the geographic location or region of the hardware (e.g., server) that supports or maintains the particular entity.

In various examples, database manager computing device 102 may leverage the metadata (and associated attributes) stored in data repository 116 to generate specified views or search result datasets. In such examples, database manager computing device 102 may communicate with data repository 116, to query for the search result dataset. Based on the query, database manager computing device 102 may obtain, from data repository 116 search result dataset of metadata (and associated attributes) to database manager computing device 102. In some instances, database manager computing device 102 may generate a database object of the search result dataset. Additionally, database manager computing device 102 may store the database object in a cache database. That way the corresponding search results may be quickly obtained if needing to be called up again.

For example, database manager computing device 102 may communicate with data repository 116 to query for metadata of all the virtual machines of cloud database system 103C. Based on the query, database manager computing device 102 may obtain, from data repository 116, a search result dataset. The search result dataset may include metadata (and associated attributes) of all the virtual machines of cloud database system 103C. In some instances, database manager computing device 102 may generate a database object of the search result dataset. Additionally, database manager computing device 102 may store the database object in a cache database. That way the corresponding search results may be quickly obtained if needing to be called up again.

In various examples, one or more database objects stored in a cache database may be automatically updated periodically. In such examples, the one or more database objects may include one or more data elements indicating the data source of the metadata (e.g., an address for the metadata API relevant to the metadata included in the search result dataset or database). Additionally, database manager computing device 102 may utilize the one or more data elements of the one or more database objects to determine a corresponding data source and pull, fetch and update the one or more database objects automatically and periodically. In some examples, an operator of a device, such as the database manager computing device 102 or mobile computing device 110, 112, 114, may cause one or more database objects stored in the cache database, based on an input to the device by the operator (e.g., a request to update a particular database object).

In some examples, each search result dataset or database object may include a timestamp data indicating a time and date of creation and an update timestamp data indicating a time of date of the latest update. Additionally, each search result dataset or database object may be associated with a particular query. Moreover, each search result dataset or database object may store or link to multiple records. Each record may identify and characterize metadata captured at a particular time and date as well as a timestamp indicating the time and date of update. In some instances, each record may also include one or more attribute data associated with the corresponding captured metadata. Further, the update timestamp data of the search result dataset or database object may reflect the timestamp of the corresponding record with the most recently captured metadata.

In another example, database manager computing device 102 may query data repository 116, for metadata of all the entities, such as virtual machines, that support and maintain a particular application. Based on the query, database manager computing device 102 may obtain, from data repository 116, a search result dataset. The search result dataset may include metadata (and associated attributes) of all the entities, such as virtual machines, that support and maintain the particular application. In some instances, the virtual machines may originate from one or more cloud database systems (e.g., cloud database systems 103A, 103B, 103C). In other instances, database manager computing device 102 may generate a database object of the search result dataset. Additionally, database manager computing device 102 may store the database object in a cache database. That way the corresponding search results may be quickly obtained if needing to be called up again.

In some examples, monitoring computing system 105 may be associated with an e-commerce entity and may be configured to monitor and implement various levels of analysis and determinations based on the metadata and/or associated attributes of each of the multiple cloud database systems. As illustrated in FIG. 1, monitoring computing system 105 may include monitoring computing device 105A. Additionally, monitoring computing system 105, including monitoring computing device 105A, may be operably coupled to communication network 108 via one or more monitoring computing devices 105A. Although FIG. 1 illustrates a single monitoring computing device 105A, monitoring computing system 105 may include any number of monitoring computing devices 105A.

In some examples, monitoring computing device 105A can communicate with data repository 116 over communication network 108. Monitoring computing device 105A may send data to, and receive data from, data repository 116. For example, monitoring computing device 105A may request and obtain one or more search result datasets or database objects from data repository 116. In some instances, the search result datasets or database objects may be associated with a particular entity of a particular cloud database system (e.g., cloud database system 103A, 103B, 103C) or type of entity of one or more cloud database systems. In other instances, the search result datasets or database objects may be associated with a particular application maintained and supported by one or more multiple cloud database In various examples, monitoring computing device 105A can utilize one or more records of the search result datasets or database objects to generate values of one or more s (e.g., power state, health state, etc.) associated with one or more entities of the one or more of the multiple cloud database systems (e.g., cloud database system 103A, 103B, 103C) or one or more applications supported and maintained by the one or more cloud database systems. For example, monitoring computing device 105A may generate values of one or more metrics associated with one or more entities of the one or more of the multiple cloud database systems based on search result datasets or database objects associated with the one or more entities. In some instances, monitoring computing device 105A may utilize the search result datasets or database objects to generate values of one or more metrics on an aggregate basis across one or more geographic locations or regions during one or more intervals (e.g., distribution of various types of entities across various regions and their associated power state).

In another example, monitoring computing device 105A may utilize one or more records of the search result datasets or database objects associated with one or more applications supported and maintained by one or more of the multiple cloud database systems (e.g., cloud database system 103A, 103B, 103C) to generate values of one or more metrics associated with one or more applications supported by or maintained by the one or more of the multiple cloud database systems, such as entity count of a particular entity type. Further, monitoring computing device 105A may generate the values one or more metrics associated with one or more applications on an aggregate basis across one or more geographic locations or regions during one or more intervals (e.g., distribution of various types of entities across various regions that support and maintain a particular application and their associated power state).

In some examples, an operator or analyst operating monitoring computing device 105A may make queries associated with each previously generated search result dataset or database object. In such examples, monitoring computing device 105A may query for the previously generated search result dataset or database object stored in data repository 116, and based on the query, monitoring computing device 105A may obtain a second search result dataset associated with the query. For example, monitoring computing device 105A may obtain a search result dataset or database object that includes metadata (and associated attributes) of all the virtual machines of cloud database system 103A and cloud database system 103B, based on a first query. Additionally, monitoring computing device 105A may utilize the search result dataset or database object to determine and generate a first dataset indicating the distribution of virtual machines across various regions and their associated power states. Moreover, a user or operator of monitoring computing device 105A may utilize monitoring computing device 105A to make a second query, within the search result dataset or database object stored in data repository 116, for virtual machines of cloud database system 103A and cloud database system 103B within a particular region. In response to the second query, monitoring computing device 105A may obtain, from the search result dataset or database object stored in data repository 116, a search result dataset associated with the second query. The search result dataset associated with the second query may include metadata (and associated attributes) of the virtual machines of cloud database system 103A and cloud database system 103B within the particular region. In some instances, monitoring computing device 105A may utilize the search result dataset associated with the second query to determine and generate a second dataset identifying all the subscriptions within the particular region, the distribution of virtual machines running off of each subscription, the number of applications running off of each subscription, and an indication of the various status of the virtual machines.

In various examples, a search result dataset or database object stored in data repository 116 may include one or more data elements characterizing one or more parameters of a query that the search result dataset or database object is based off of. In such examples, a querying device, such as database manager computing device 102 or monitoring computing device 105A may determine whether a query may have been previously implemented and a corresponding search result dataset or database object exists in data repository 116. For instance, the querying device may make such determinations, based in part on the one or more data elements of the search result datasets or database objects stored in data repository 116. For example, when monitoring computing device 105A initiates a query with data repository 116, monitoring computing device 105A may determine whether a similar query was previous made by comparing one or more parameters of the query and the one or more data elements of the search result datasets or database objects stored in data repository 116 that characterize the query the corresponding search result dataset or database object was based off of. Upon determining a match between the one or more parameters of the query and the one or more data elements of a particular search result dataset or database object that characterize the query the corresponding search result dataset or database object was based off of, monitoring computing device 105A may obtain that particular search result dataset or database object. Alternatively, upon determining there isn't a match between the one or more parameters of the query and any of the one or more data elements of the search result datasets or database objects stored in data repository 116 that characterize the query the corresponding search result dataset or database object was based off of, monitoring computing device 105A may communicate with database manager computing device 102 to identify the metadata (and associated attributes) associated with the query and generate and transmit, to monitoring computing device 105A, a search result dataset or database object including the identified metadata (and associated attributes) associated with the query. In some instances, monitoring computing device 105A may directly identify the metadata (and associated attributes) associated with the query and obtain a corresponding search result dataset of the metadata (and associated attributes). In such instances, monitoring computing device 105A may generate a database object based on the search result dataset.

In some examples, the search result dataset or database object may include one or more data elements indicating the data source of the metadata (e.g., an address for the metadata API relevant to the metadata included in the search result dataset or database). Additionally, the search result dataset or database object maybe configured to trigger a querying device, such as monitoring computing device 105A or database manager computing device 102, to update, pull or obtain the most up to date version of the metadata included in the search result dataset or database object. Monitoring computing device 105A or database manager computing device 102 may update, pull or obtain the most up to date version of the metadata included in the search result dataset or database object using the one or more data elements indicating the data source of the metadata.

For example, monitoring computing device 105A may query data repository 116 for metadata of one or more entities of one or more of multiple cloud database systems (e.g., cloud database system 103A, 103B, 103C). As described herein, monitoring computing device 105A may determine whether the query was previously made based on a comparison between one or more parameters of the query and one or more data elements of search result dataset or database objects stored in data repository 116 that characterize the query the corresponding search result database or database object is based off of. In response to determining the query was previously made, monitoring computing device 105A may obtain the corresponding search result dataset or database object. Additionally, the corresponding search result dataset or database object may be configured to trigger monitoring computing device 105A to update, pull or obtain the most up to date version of the metadata included in the search result dataset or database object. As such, upon monitoring computing device 105A obtaining the corresponding search result dataset or database object, monitoring computing device 105A may update, pull or obtain the most up to date version of the metadata included in the corresponding search result dataset or database object.

In some instances, monitoring computing device 105A may update, pull or obtain the most up to date version of the metadata included in the corresponding search result dataset or database object directly from the data sources of the metadata, using the one or more data elements indicating the data source of the metadata. In other instances, monitoring computing device 105A may update, pull or obtain the most up to date version of the metadata included in the corresponding search result dataset or database object directly from the data sources of the metadata, via database manager computing device 102. For instance, monitoring computing device 105A may transmit instructions to database manager computing device 102 to obtain the most up to date version of the metadata included in the corresponding search result dataset or database object, upon monitoring computing device 105A obtaining the corresponding search result dataset or database object. Database manager computing device 102 may update the metadata included in the corresponding search result dataset or database object using the one or more data elements indicating the data source of the metadata. The corresponding search result dataset or database object may be stored in data repository 116. Data repository 116 may transmit the corresponding updated search result dataset or database object to monitoring computing device 105A.

In another example, database manager computing device 102 may query data repository 116 for metadata of one or more entities of one or more cloud database systems (e.g., cloud database system 103A, 103B, 103C). As described herein, database manager computing device 102 may determine the query was previously made based on a comparison between one or more data elements of the query and one or more data elements of search result dataset or database objects stored in data repository 116 that characterize the query the corresponding search result dataset or database object is based off of. In response to determining the query was previously made, database manager computing device 102 may obtain, from database repository 116, a corresponding search result dataset or database object. Additionally, the corresponding search result dataset or database object may be configured to trigger database manager computing device 102, to update, pull or obtain the most up to date version of the metadata included in the search result dataset or database object. As such, upon database manager computing device 102 obtaining the corresponding search result dataset or database object, database manager computing device 102 may update, pull or obtain the most up to date version of the metadata included in the corresponding search result dataset or database object. In some instances, database manager computing device 102 may update, pull or obtain the most up to date version of the metadata included in the corresponding search result dataset or database object, based on the data elements that indicate the origins of the metadata.

In various examples, monitoring computing device 105A may perform operations to generate and render for presentation at a computing system or device of an analyst (e.g., database manager computing device 102 and/or mobile computing device 110, 112, 114), a digital interface, such as an interactive, digital dashboard. The digital dashboard may have interface elements that identify one or more entities of one or more cloud database systems (e.g., cloud database system 103A, 103B, 103C) and/or one or more applications supported and maintained by the one or more cloud database systems, and their respective statuses. Additionally, the digital dashboards may provide a graphical representation of a current status of each of the one or entities or each of the one or more applications as well as historical data characterizing the status of each of the one or entities or each of the one or more applications over one or more prior temporal intervals. Moreover, the digital dashboards may, upon presentation by the computing system or device of an analyst, may provide a graphical representation characterizing the distribution of entities of each of the one or more cloud database systems, distribution of entities of each of the one or more cloud database systems over various geographical locations/regions, distribution of subscriptions within each of the one or more cloud database systems, distribution of subscriptions within each of the one or more cloud database systems over various geographical locations/regions, distribution of entities supporting each application supported by the one or more cloud database systems, and distribution of entities within various regions supporting each application supported by the one or more cloud database systems. Further, the digital dashboards may, upon presentation by the computing system or device of an analyst, also provide a graphical representation of network issues (e.g., hardware, switch, etc.) of one or more cloud database systems. The digital dashboard may enable an analyst to identify and troubleshoot, in real-time, issues associated with one or more entities of one or more cloud database system.

In some examples, monitoring computing system 105, such as monitoring computing device 105A, may maintain, support and provide a dashboard application to a device of an analyst (e.g., database manager computing device 102 or mobile computing device 110, 112, 114). Additionally, the dashboard application executing on the device of an analyst may generate the digital dashboard on a display of the device. In some instances, monitoring computing system 105, such as monitoring computing device 105A, may generate a dashboard notification based on a database object or search result dataset and/or one or more values of one or more metrics associated with the database object or search result dataset. Additionally, monitoring computing system 105 may transmit the dashboard notification to the dashboard application executing on the device of the analyst. The dashboard application may generate the interface elements of the digital dashboard based on the dashboard notification (e.g., the aforementioned graphical representations, one or more display screens or windows of the digital dashboard).

In various examples, an interactive digital dashboard may enable an analyst interacting with the interactive digital dashboard presented on a device on the device of the analyst (e.g., monitoring computing device 105A or mobile computing device 110, 112, 114) to query within various database objects or search result datasets. For instance, the digital dashboard may include an interface element, such as a search bar that enables the analyst to query or search within a particular database object or search result datasets. For example, the device of the analyst may present an interactive digital dashboard with interface elements associated with the distribution of virtual machines within various regions supporting a first application supported by cloud database system 103A and cloud database system 103B. Additionally, the interactive digital dashboard includes a search bar that enables the analyst to search within a database object or search result dataset associated with the distribution of virtual machines within various regions supporting a first application supported by cloud database system 103A and cloud database system 103B. For instance, the analyst may input various keyword search terms into the search bar to cause the interactive digital dashboard to present a corresponding search result that is based in part on the keyword search terms and the database object or search result dataset.

In some examples, the dashboard application may execute on mobile computing device 110, 112, 114. In such examples, dashboard application may transmit, to monitoring computing system 105 (e.g., monitoring computing device 105A), keyword data characterizing one or more keyword search terms that were inputted into the search bar by the analyst. In examples where the search result dataset or the database object is in tabular format, monitoring computing system 105 (e.g., monitoring computing device 105A) may compare each of the keyword search terms with each and every value in each and every column of each row of the database object or search result dataset. Based on the comparison, monitoring computing system 105 (e.g., monitoring computing device 105A) may identify values that are a match (partial or full) and generate an additional dashboard notification including the identified values. Monitoring computing system 105 (e.g., monitoring computing device 105A) may transmit, to the dashboard application executing on the device of the analyst (e.g., database manager computing device 102 or mobile computing device 110, 112, 114), the additional dashboard notification. The dashboard application may generate and present on the digital dashboard search results based on the identified values of the dashboard notification.

In other examples, the dashboard application may be executing on monitoring computing device 105A. The dashboard application may generate keyword data characterizing one or more keyword search terms that were inputted into the search bar by the analyst. In instances where the search result dataset or the database object is in tabular format, monitoring computing device 105A may compare each of the keyword search terms of the keyword data with each and every value in each and every column of each row of the database object or search result dataset. Based on the comparison, monitoring computing device 105A may identify values that are a match (partial or full) and generate an additional dashboard notification including the identified values. Monitoring computing device 105A may transmit, to the dashboard application, the additional dashboard notification. The dashboard application may process the additional dashboard notification and generate and present on the digital dashboard search results based on the identified values of the additional dashboard notification.

In other examples, to reduce the required computing resources and time to search for the identified values, the search result dataset or database object may be modified. For example, database manager computing device 102 may add an additional column, such as a string representation column, to the search result dataset or the database object. Additionally, for each row (that represents a particular entity), the added column may include a string representation of all the other values of all the other columns within the corresponding row. That way, when monitoring computing system 105, including monitoring computing device 105A, determines which values to include in the dashboard notification in response and based on the keyword data, monitoring computing system 105 may compare the one or more keyword search terms with one column, the string representation column, of each row, instead of each and every value in each and every column of each row of the database object or search result dataset.

Figure 2:
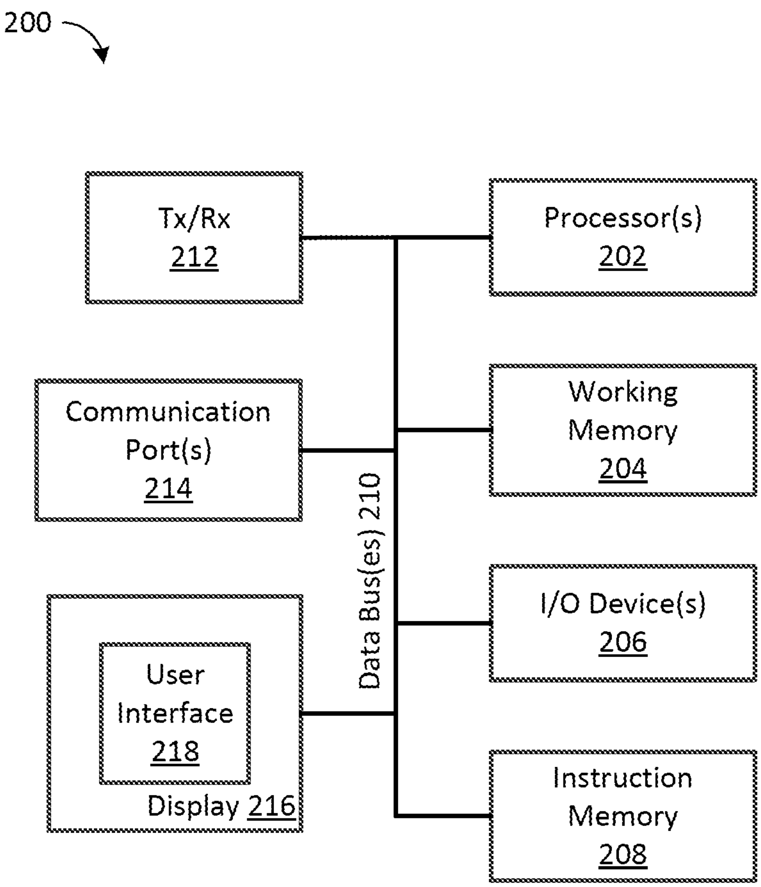
FIG. 2 illustrates a block diagram of example database manager computing device 102 of FIG. 1 in accordance with some embodiments.

FIG. 2 illustrates a block diagram of example database manager computing device 102 of FIG. 1. Database manager computing device 102 can include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Processors 202 can be configured to perform a certain function or operation by executing code, stored on instruction memory 208, embodying the function or operation. For example, processors 202 can be configured to execute code stored in instruction memory 208 to perform one or more of any function, method, or operation disclosed herein.

Additionally, processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of database manager computing device 102. Working memory 204 can be a random access memory (RAM) such as a static random access memory (SRAM) or dynamic random access memory (DRAM), or any other suitable memory.

Input/output devices 206 can include any suitable device that allows for data input or output. For example, input/output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as interaction data, product data, and/or keyword search data.

Display 216 can display user interface 218. User interface 218 can enable user interaction with database manager computing device 102. For example, user interface 218 can be a user interface for an application of a retailer that allows a customer to view and interact with a retailer's website. In some examples, a user can interact with user interface 218 by engaging input/output devices 206. In some examples, display 216 can be a touchscreen, where user interface 218 is displayed on the touchscreen.

Transceiver 212 allows for communication with a network, such as the communication network 108 of FIG. 1. For example, if communication network 108 of FIG. 1 is a cellular network, transceiver 212 is configured to allow communications with the cellular network. In some examples, transceiver 212 is selected based on the type of communication network 108 database manager computing device 102 will be operating in. Processor(s) 202 is operable to receive data from, or send data to, a network, such as communication network 108 of FIG. 1, via transceiver 212.

Metadata Aggregation

Figure 3A:
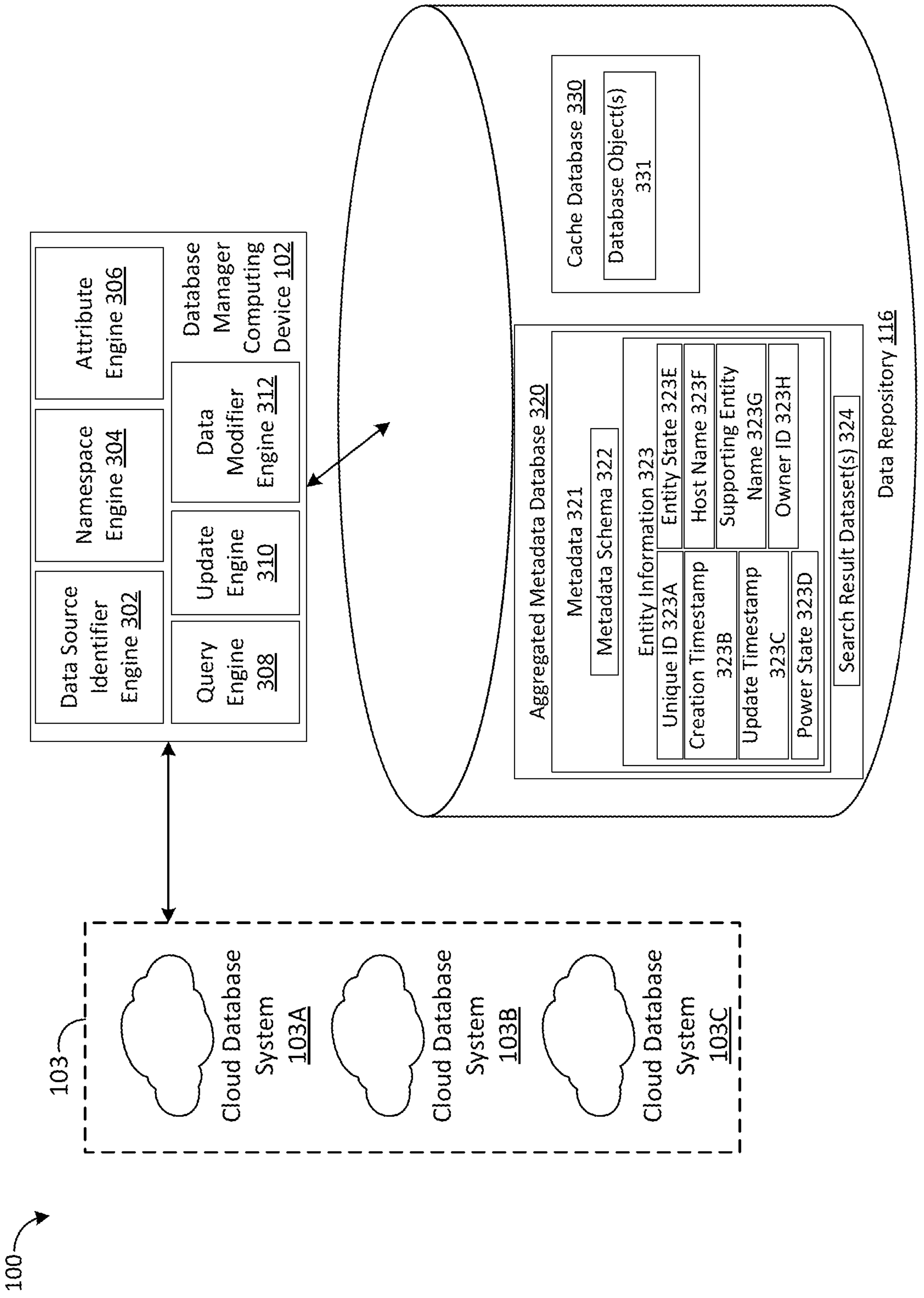
FIGS. 3A and 3B are a block diagrams illustrating examples of various portions of the database manager computing device 102 of FIG. 1 in accordance with some embodiments.
Figure 3B:
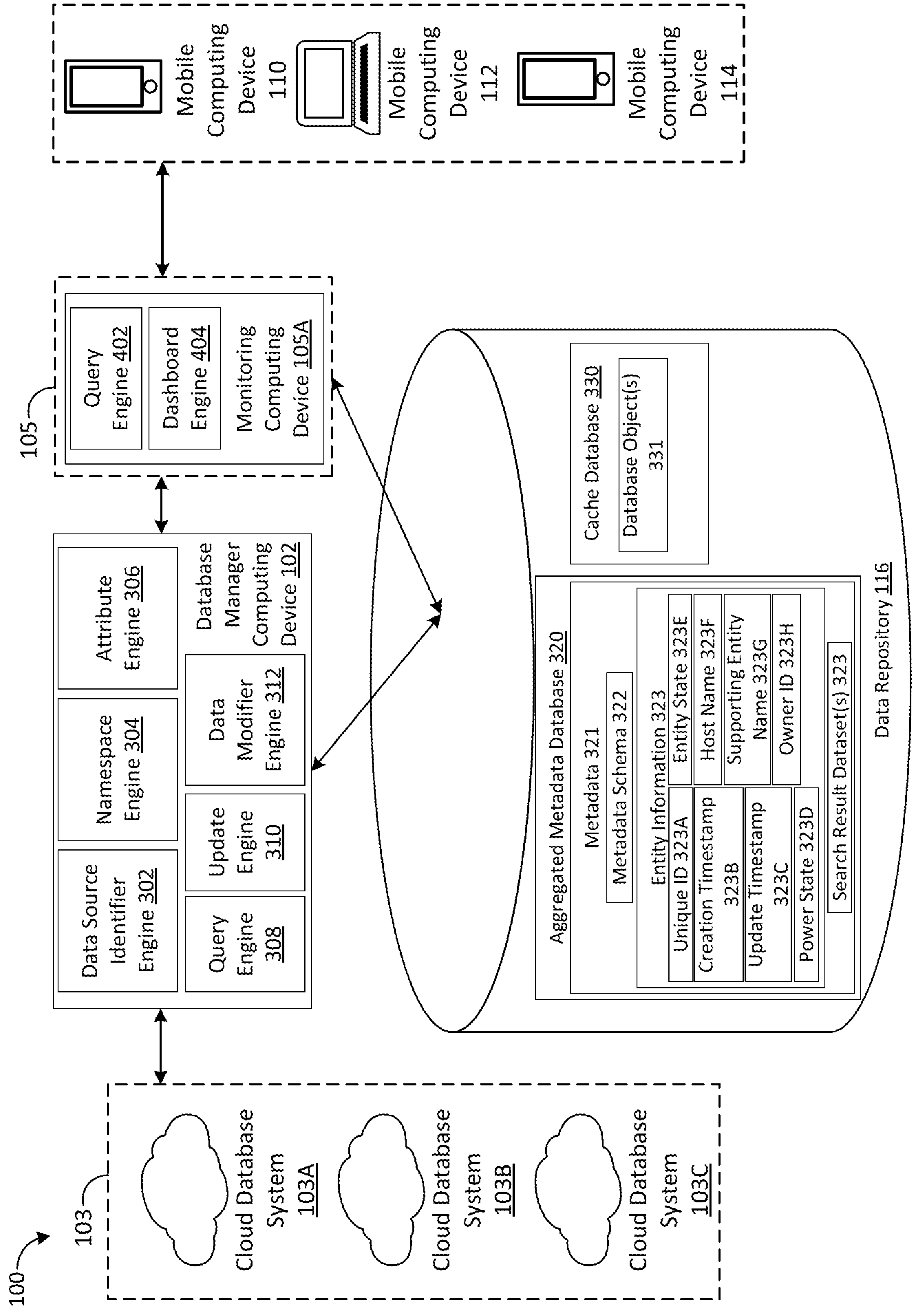

FIGS. 3A and 3B are block diagrams illustrating examples of various portions of the database manager computing device 102. As illustrated in FIG. 3A, database manager computing device 102 can include data source identifier engine 302, namespace engine 304, and attribute engine 306. In some examples, one or more of data source identifier engine 302, namespace engine 304 and attribute engine 306 may be implemented in hardware. In other examples, one or more of data source identifier engine 302, namespace engine 304 and attribute engine 306 may be implemented as an executable program maintained in a tangible, non-transitory memory, such as instruction memory 208 of FIG. 2, that may be executed by one or processors, such as processor 202 of FIG. 2.

As illustrated in FIG. 3A, data repository 116, may include aggregated metadata database 320. Aggregated metadata database 320 may store one or more data elements of metadata 321 of one or more of the multiple cloud database systems 103A, 103B, 103C into data repository 116. In some examples, the one or more data elements of metadata 321 may include metadata schema 322 (e.g., schema information—the structure and organization) of the corresponding cloud database system (e.g. cloud database system 103A). Further, the one or more data elements of metadata 321 may be associated with entity information 323 regarding a particular entity (e.g., virtual machines, hypervisors, subnets, volumes, assigned IPs, projects, etc.) of the corresponding cloud database system (e.g., cloud database system 103B). Examples of the one or more data elements associated with entity information include at least the name of the corresponding entity, unique identifier 323A of the entity, creation timestamp 323B (e.g., time and/or date of creation), update timestamp 323C (e.g., time and/or date of latest update), power state 323D, entity state 323E, host name 323F, supporting entity name 323G (e.g., name of related entity the corresponding entity may be running on or being supported/maintained by, such as name of hypervisor that the corresponding entity, a virtual machine, is running off of), and owner identifier 323H.

In some examples, database manager computing device 102 may implement a set of operations that obtain and store metadata 321 of one or more of the multiple cloud database systems 103A, 103B, 103C into aggregated metadata database 320. In some instances, database manager computing device 102 may execute data source identifier engine 302. Executed data source identifier engine 302 may be a library, such as a foreign data wrapper (FDW), configured to identify cloud database systems (e.g., cloud database systems 103A, 103B, 103C) that database manager computing device 102 may communicate with and obtain one or more data elements of metadata 321. Further, executed data source identifier engine 302 may store the obtained elements of metadata 321 in aggregated metadata database 320.

In some examples, an operator or analyst operating database manager computing device 102 may instruct database manager computing device 102 to obtain metadata 321 of one or more entities of one or more cloud database systems and/or metadata 321 of one or more applications that are supported and maintained by one or more cloud database systems (e.g., metadata 321 of one or more entities of the one or more cloud database systems that support and maintain the one or more applications). In such examples, the instructions may cause database manager computing device 102 to obtain and store the relevant metadata 321 into aggregated metadata database 320.

In some examples, the cloud database system, such as cloud database systems 103A, 103B, 103C, may be configured to be public. In such examples, database manager computing device 102 may interrogate the relevant metadata APIs to obtain the relevant meta data. For example, for a particular virtual machine of cloud database system 103A, executed data source identifier engine 302 may directly submit metadata requests for the particular virtual machine to the relevant metadata APIs associated with the particular virtual machine. In response to the request, executed data source identifier engine 302 may obtain from each of the relevant metadata APIs the requested metadata 321 and store the requested metadata 321 in aggregated metadata database 320.

In other examples, the cloud database system, such as cloud database systems 103A, 103B, 103C, may be configured to be private. In such examples, database manager computing device 102 may obtain the relevant metadata 321 from the cloud database system using credentials (e.g., user name and password). For example, for a particular virtual machine of cloud database system 103B, executed data source identifier engine 302 may obtain the credentials to access database manager computing device 102. Additionally, for a particular virtual machine, executed data source identifier engine 302 may utilize the credentials to access cloud database system 103B and obtain metadata 321 associated with the particular virtual machine. Further, executed data source identifier engine 302 may store the metadata 321 associated with the particular virtual machine in aggregated metadata database 320.

In some instances, the metadata 321 of each of the multiple cloud database systems 103A, 103B and 103C may be organized or structured identically or very similarly. To avoid collision of identically named metadata 321 originating from different cloud database systems, database manager computing device 102 may generate or create a uniquely identified namespace for each of the multiple cloud database systems 103A, 103B, 103C that metadata 321 is being pulled from. In some examples, database manager computing device 102 may execute namespace engine 304. Executed namespace engine 304 may generate or create, within aggregated metadata database 320, a uniquely identified namespace for each of the multiple cloud database systems, such as cloud database systems 103A, 103B, 103C, that executed data source identifier engine 302 pulls metadata 321 from. Further, executed data source identifier engine 302 may store obtained metadata 321 of a particular cloud database system into a uniquely identified namespace corresponding to the particular cloud database system. For example, executed namespace engine 304 may generate or create, within aggregated metadata database 320, a uniquely identified namespace associated with cloud database system 103C. Additionally, executed data source identifier engine 302 may store one or more elements of metadata 321 obtained from cloud database system 103C into the namespace associated with cloud database system 103C.

In some instances, metadata 321 stored within aggregated metadata database 320 may be in a tabular format. For example, within a namespace associated with cloud database system 103B, metadata 321 may be in tabular format. Additionally, each row may identify a particular entity, and each column of each row may be associated with a particular data element. Examples of the one or more data elements include unique identifier 323A of the entity, creation timestamp 323B (e.g., time and/or date of creation), update timestamp 323C (e.g., time and/or date of latest update), power state 323D, entity state 323E, host name 323F, supporting entity name 323G (e.g., name of related entity the corresponding entity may be running on or being supported/maintained by, such as name of hypervisor that the corresponding entity, a virtual machine, is running off of), and owner identifier 323H.

In some examples, metadata 321 stored within aggregated metadata database 320 may be assigned or associated with one or more attributes. In such examples, database manager computing device 102 may execute attribute engine 306 to assign or associate one or more attributes to metadata 321. In some instances, executed attribute engine 306 may assign or associate one or more attributes to metadata 321 on the fly. For example, data source identifier engine 302 may obtain metadata 321 from cloud database system 103A. Additionally, data source identifier engine 302 may store metadata 321 of cloud database system 103A into a namespace associated with cloud database system 103A that namespace engine 304 creates. While data source identifier engine 302 stores metadata 321 of cloud database system 103A into the namespace of cloud database system 103A, executed attribute engine 306 may associate one or more attributes with metadata 321 of cloud database system 103A. Examples of the one or more attributes include an identifier of the namespace that the metadata 321 is being stored or placed into and geographic location or region of the database that supports or maintains the particular entity.

In various examples, data repository 116 may include cache database 330. Cache database 330 may store a database object 331 of specified views or search result datasets 324 obtained by database manager computing device 102. In some examples, database manager computing device 102 may leverage the metadata 321 (and associated attributes) stored in data repository 116 to obtain search result datasets 324. In such examples, database manager computing device 102 may execute query engine 308 to obtain the search result datasets 324. Additionally, executed query engine 308 may query aggregated metadata database 320 for the search result datasets 324. Based on the query, executed query engine 308 may obtain the search result dataset 324 of metadata 321 (and associated attributes) from aggregated metadata database. In some instances, executed query engine 308 may generate a database object 331 of the search result datasets 324. Additionally, executed query engine 308 may store the database object 331 in cache database 330. In various instance, executed query engine 308 may store the search result datasets 324 in aggregated metadata database 320.

For example, executed query engine 308 may query, within aggregated metadata database 320, for metadata 321 (and associated attributes) of all the hypervisors of cloud database system 103A. Based on the query, executed query engine 308 may identify the relevant metadata 321 (and associated attributes) of all the hypervisors of cloud database system 103A. Additionally, executed query engine 308 may obtain, from aggregated metadata database 320, a search result dataset 324. The search result dataset 324 may include metadata 321 (and associated attributes) of all the hypervisors of cloud database system 103A. In some instances, executed query engine 308 may generate a database object 331 of the search result dataset 324. Additionally, executed query engine 308 may store the database object 331 in cache database 330. In various instance, executed query engine 308 may store the search result datasets 324 in aggregated metadata database 320.

In other examples, executed query engine 308 may query, within aggregated metadata database 320, for metadata 321 of all the entities, such as virtual machines, that support and maintain a particular application. Based on the query, executed query engine 308 may identify the relevant metadata 321 (and associated attributes) of all the entities, such as virtual machines, that support and maintain a particular application from aggregated metadata database 320. The search result dataset 324 may include metadata 321 (and associated attributes) of all the entities, such as virtual machines, that support and maintain the particular application. In some instances, the virtual machines may originate from one or more cloud database systems (e.g., cloud database systems 103A, 103B, 103C). In other instances, executed query engine 308 may generate a database object 331 of the search result dataset 324. Additionally, executed query engine 308 may store the database object 331 in cache database 330. In various instance, executed query engine 308 may store the search result datasets 324 in aggregated metadata database 320.

In some examples, one or more database objects 331 stored in cache database 330 may be automatically updated periodically. In such examples, the one or more database objects 331 may include one or more data elements indicating the data source of the metadata 321 (e.g., an address for the metadata API relevant to the metadata 321 included in the search result dataset 324 or database object 331). Additionally, executed query engine 308 may utilize the one or more data elements of the one or more database objects 331 to determine a corresponding data source and pull, fetch and update the one or more database objects 331 automatically and periodically. For example, executed query engine 308 may determine from one or more data elements of a database object 331 stored in cache database 330, the data source of the database object 331 is cloud database system 103B. Additionally, based on such determinations, executed query engine 308 may pull, fetch and update the database object 331 automatically and periodically (e.g., every 10 minutes) from cloud database system 103B.

In some instances, an operator of a device, such as the database manager computing device 102 or mobile computing device 110, 112, 114, may cause one or more database objects 331 stored in the cache database to update, based on an input to the device by the operator (e.g., a request to update one or more particular database objects 331). For example, the operator of the device can trigger an update of a particular database object 331 stored in cache database 330 based on an input to the device by the operator. In examples where the device is the database manager computing device 102, the input may trigger executed query engine 308 to determine from one or more data elements of a database object 331 stored in cache database 330, the data source of the database object 331 is cloud database system 103A. Additionally, based on and in response to such determinations, executed query engine 308 may pull, fetch and update the database object 331 from cloud database system 103A.

In examples where the device is the mobile computing device (e.g., mobile computing device 110, 112, 114), the operator of the mobile computing device may provide an input, via the mobile computing device, to trigger the update of a first database object 331 and a second database object 331 stored in cache database 330. The input may specify updating a first database object 331 and a second database object 331. Additionally, based on the input, the mobile computing device may generate and transmit a data package to database manager computing device 102. The data package may identify the first database object 331 and the second database object 331 and include a request to update the first database object 331 and the second database object 331. Based on the data package, executed query engine 308 may determine or identify, in cache database 330, the first database object 331 and the second database object 331. Additionally, executed query engine 308 may determine, from one or more data elements of the first database object 331 and the second database object 331, the data source associated with the first database object 331 is cloud database system 103B and the data source associated with the second database object 331 is cloud database system 103C. Moreover, based on and in response to such determinations, executed query engine 308 may pull, fetch and update the first database object 331 from cloud database system 103B and the second database object 331 from cloud database system 103C.

In some examples, each search result dataset 324 or database object 331 may include a timestamp data indicating a time and date of creation and an update timestamp data indicating a time of date of the latest update. Additionally, each search result dataset 324 or database object 331 may be associated with a particular query. Moreover, each search result dataset 324 or database object 331 may store or link to multiple records. Each record may identify and characterize metadata 321 captured at a particular time and date as well as a timestamp indicating the time and date of capture. In some instances, each record may also include one or more attribute data associated with the corresponding captured metadata 321. Further, the update timestamp data of the search result dataset 324 or database object 331 may reflect the timestamp of the corresponding record with the most recently captured metadata 321.

Monitoring System

Referring to FIG. 3B, monitoring computing system 105 may be configured to communicate with data repository 116 over communication network 108. In some examples, monitoring computing system 105 may be associated with an e-commerce entity. Further, monitoring computing system 105 may be configured to monitor and implement various levels of analysis and determinations of one or more of the multiple cloud database systems (e.g., cloud database system 103A, cloud database system 103B, cloud database system 103C) based on the metadata 321 of each of the multiple cloud database systems. As illustrated in FIG. 3B, monitoring computing system 105 may include monitoring computing device 105A. Additionally, monitoring computing system 105, including monitoring computing device 105A, may communicate with data repository 116 over communication network 108. Monitoring computing device 105A may send data to, and receive data from, aggregated metadata database 320 and/or cache database 330 to implement various levels of analysis and determinations of one or more of the multiple cloud database systems.

In some examples, monitoring computing device 105A may request and obtain one or more search result datasets 324 from aggregated metadata database 320 or one or more database objects 331 from cache database 330. In some instances, the search result datasets 324 or database objects 331 may be associated with a particular entity of a particular cloud database system (e.g., cloud database system 103A, 103B, 103C) or type of entity of one or more cloud database systems. In other instances, the search result datasets 324 or database objects 331 may be associated with a particular application maintained and supported by one or more multiple cloud database.

In various examples, monitoring computing device 105A can utilize one or more records of the search result datasets 324 or database objects 331 to generate values of one or more metrics (e.g., power state, health state, etc.) associated with one or more entities of the one or more of the multiple cloud database systems (e.g., cloud database system 103A, 103B, 103C) or one or more applications supported and maintained by the one or more cloud database systems. For example, monitoring computing device 105A may query, within aggregated metadata database 320 or cache database 330, for metadata 321 of one or more virtual machines of cloud database system 103A and cloud database system 103B. Based on the query, monitoring computing device 105A may obtain, from aggregated metadata database 320 or cache database 330, a search result dataset 324 (including metadata 321 of one or more virtual machines of cloud database system 103A and cloud database system 103B and associated attributes) or database object 331 (including metadata 321 of one or more virtual machines of cloud database system 103A and cloud database system 103B and associated attributes) associated with the query. Further, monitoring computing device 105A may generate values of a health state of one or more virtual machines of the cloud database system 103A and cloud database system 103B, based on the search result dataset 324 or database object 331.

In some instances, monitoring computing device 105A may utilize the search result datasets 324 or database objects 331 to generate values of one or more metrics on an aggregate basis across one or more geographic locations or regions during one or more intervals. For example, monitoring computing device 105A may query, within aggregated metadata database 320 or cache database 330, for metadata 321 of all virtual machines of cloud database system 103C. Based on the query, monitoring computing device 105A may obtain, from aggregated metadata database 320 or cache database 330, a search result dataset 324 (including metadata 321 of one or more virtual machines of cloud database system 103C and associated attributes) or database object 331 (including metadata 321 of one or more virtual machines of cloud database system 103C and associated attributes) associated with the query. Further, monitoring computing device 105A may generate values of the power state of each of the virtual machines based on each record of the search result dataset 324 or database object 331.

Given that there may be multiple records included in the search result dataset 324 or database object 331, and each record may identify and characterize metadata 321 captured at a particular time and date as well as a timestamp indicating the time and date of update, the generated values may indicate a value of a metric, such as, the power state of a particular virtual machine at a particular point in time. Additionally, since the search result dataset 324 or database object 331 may include location or geographical information associated with each entity, such as a particular virtual machine, generated values of a metric, such as the power state of a particular virtual machine, may be associated with a particular location or region. Monitoring computing device 105A may aggregate the values of each virtual machine and present such values to an operator operating monitoring computing device 105A. Such a presentation may show the distribution of the virtual machines across various locations/regions and their associated power states over one or more time intervals. Additionally, such a presentation may indicate computing resource utilization a particular application over time.

In another example, monitoring computing device 105A may utilize one or more records of the search result datasets 324 or database objects 331 associated with one or more applications supported and maintained by one or more of the multiple cloud database systems (e.g., cloud database system 103A, cloud database system 103B, cloud database system 103C) to generate values of one or more metrics associated with one or more applications supported or maintained by the one or more of the multiple cloud database systems, such as entity count of a particular entity type. Further, monitoring computing device 105A may generate the values one or more metrics associated with one or more applications on an aggregate basis across one or more geographic locations or regions during one or more intervals (e.g., distribution of various types of entities across various regions that support and maintain a particular application and their associated power state). For example, monitoring computing device 105A may query, within aggregated metadata database 320 or cache database 330, for metadata 321 of all the virtual machines that support a particular application. In such an example, the application may be supported by a number of virtual machines of one or more cloud database systems (e.g., cloud database system 103A, 103B, 103C). Based on the query, monitoring computing device 105A may obtain, from aggregated metadata database 320 or cache database 330, a search result dataset 324 or database object 331 associated with the query (including metadata 321 of all the virtual machines that support a particular application and associated attributes). Further, monitoring computing device 105A may generate values of the power state of each of the virtual machines that support the particular application, based on each record of the search result dataset 324 or database object 331. Given that there may be multiple records included in the search result dataset 324 or database object 331, and each record may identify and characterize metadata 321 (and associated attributes) captured at a particular time and date as well as a timestamp indicating the time and date of update, the generated values may indicate a value of a metric, such as, the power state of a particular virtual machine at a particular point in time. Additionally, since the search result dataset 324 or database object 331 may include location or geographical information associated with each entity, such as a particular virtual machine, generated values of a metric, such as the power state of a particular virtual machine, may be associated with a particular location or region. Monitoring computing device 105A may aggregate the values of each virtual machine and present such values to an operator operating monitoring computing device 105A. Such a presentation may show the distribution of the virtual machines across various locations/regions that support and maintain the particular application. Additionally, the presentation may show the associated power states over one or more time intervals.

In some examples, an operator or analyst operating monitoring computing device 105A may make queries within a particular search result dataset 324 or database object 331. In such examples, monitoring computing device 105A may query aggregated metadata database 320 or cache database 330. In some instances, the query may be for metadata 321 associated with a particular search result dataset 324 or database object 331 and one or more entities of one or more cloud database systems (e.g., cloud database system 103A, 103B, 103C). In other instances, the query may be for metadata 321 associated with a particular search result dataset 324 or database object 331 and one or more entities of one or more cloud database systems that support or maintain a particular application. Based on the query of the particular search result dataset 324 or database object 331, monitoring computing device 105A may obtain, from aggregated metadata database 320 or cache database 330, a second search result dataset associated with the query.

For example, monitoring computing device 105A may obtain a search result dataset 324 or database object 331 that includes metadata 321 of all the virtual machines of cloud database system 103A and cloud database system 103B, based on a first query. Additionally, monitoring computing device 105A may utilize the search result dataset 324 or database object 331 to determine and generate a first dataset indicating the distribution of virtual machines across various regions and their associated power states. Moreover, a user or operator of monitoring computing device 105A may utilize monitoring computing device 105A to make a second query, within the search result dataset 324 or database object 331 stored in aggregated metadata database 320 or cache database 330 respectively, for one or more data elements of metadata 321 associated with virtual machines of cloud database system 103A and cloud database system 103B within a particular region. Based on the second query, monitoring computing device 105A may obtain, from search result dataset 324 or database object 331 stored in aggregated metadata database 320 or cache database 330, a second search result dataset associated with the second query. The second search result dataset associated with the second query may include metadata 321 (and associated attributes) of the virtual machines of cloud database system 103A and cloud database system 103B within the particular region. In some instances, monitoring computing device 105A may utilize the second search result dataset associated with the second query to determine and generate a second dataset identifying values of one or more data elements of metadata 321 (and associated attributes) included in the second search result dataset. For example, monitoring computing device 105A may utilize the second search result dataset to determine and generate a second dataset identifying all the subscriptions within the particular region, the distribution of virtual machines running off of each subscription, the number of applications running off of each subscription, and an indication of the various status of the virtual machines.

In various examples, a search result dataset 324 stored in aggregated metadata database 320 or database object 331 stored in cache database 330, may include one or more data elements characterizing one or more parameters of a query that the search result dataset 324 or database object 331 is based off of. In such examples, a querying device, such as monitoring computing device 105A, database manager computing device 102 or a mobile computing device (e.g., mobile computing device 110, 112, 1143), may determine whether an initiated query may have been previously made and a corresponding search result dataset 324 or database object 331 exists in data aggregated metadata database 320 or cache database 330. Such determinations may be based in part on the one or more data elements of the search result datasets 324 or database objects 331 stored in aggregated metadata database 320 or cache database 330. In the event that the querying device determines there is a match, the querying device may obtain the previously made and corresponding search result dataset 324 or database object 331. Alternatively, in the event that aggregated metadata database 320 or cache database 330 determines there isn't a match, a search result dataset 324 associated with the query may be obtained. In some instances, a corresponding database object 331 may also be generated, based on the search result dataset 324.

For example, upon monitoring computing device 105A initiating a query within cache database 330, monitoring computing device 105A may determine whether a similar query was previous made by comparing one or more parameters of the query and the one or more data elements of the database objects 331 stored in cache database 330 that characterize the query the corresponding database object 331 was based off of. Upon determining a match between the one or more data elements of the query and the one or more data elements of a particular database object 331 that characterize the query the corresponding database object 331 was based off of, monitoring computing device 105A may obtain that particular database object 331. Alternatively, upon determining there isn't a match between the one or more data elements of the query and any of the one or more data elements of the database objects 331 stored in data repository 116 that characterize the query the corresponding database object 331 was based off of, monitoring computing device 105A may obtain a search result dataset 324 associated with the query. In some instances, monitoring computing device 105A may communicate with database manager computing device 102 to identify the metadata 321 (and associated attributes) associated with the query and obtain and transmit, to monitoring computing device 105A, a search result dataset 324 (and in some instances database object 331) including the identified metadata (and associated attributes) associated with the query. In some instances, monitoring computing device 105A may directly identify the metadata 321 (and associated attributes) associated with the query and obtain a corresponding search result dataset 324. In such instances, monitoring computing device 105A may generate database object 331 based on the search result dataset 324.

In some examples, the search result dataset 324 or database object 331 may include one or more data elements indicating the data source of the metadata 321 (e.g., an address for the metadata API relevant to the metadata 321 included in the search result dataset 324 or database and/or the originating cloud database system 103A, 103B, 103C). Additionally, the search result dataset 324 or database object 331 maybe configured to trigger a querying device, such as monitoring computing device 105A or database manager computing device 102, to update, pull or obtain the most up to date version of the metadata 321 included in the search result dataset 324 or database object 331. Monitoring computing device 105A or database manager computing device 102 may update, pull or obtain the most up to date version of the metadata 321 included in the search result dataset 324 or database object 331 using the one or more data elements indicating the data source of the metadata 321.

For example, monitoring computing device 105A may transmit, to aggregated metadata database 320 or cache database 330, a query that was previously made. As described herein, aggregated metadata database 320 or cache database 330 may determine the query was previously made based on a comparison between one or more data elements of the query and one or more data elements of search result dataset 324 or database objects 331 stored in aggregated metadata database 320 or cache database 330 that characterize the query the corresponding search result database or database object 331 is based off of. In response to determining the query was previously made, aggregated metadata database 320 or cache database 330 may transmit, to monitoring computing device 105A, a corresponding search result dataset 324 or database object 331. Additionally, the corresponding search result dataset 324 or database object 331 may be configured to trigger monitoring computing device 105A to update, pull or obtain the most up to date version of the metadata 321 included in the search result dataset 324 or database object 331. For instance, search result dataset 324 or database object 331 may include one or more data elements indicating the data source of the metadata 321 (e.g., an address for the metadata API relevant to the metadata 321 included in the search result dataset 324 or database and/or the originating cloud database system 103A, 103B, 103C). As such, upon monitoring computing device

105A obtaining the corresponding search result dataset 324 or database object 331, monitoring computing device 105A may update, pull or obtain the most up to date version of the metadata 321 included in the corresponding search result dataset 324 or database object 331, based on the one or more data elements indicating the data source of the metadata 321.

In some instances, monitoring computing device 105A may update, pull or obtain the most up to date version of the metadata 321 included in the corresponding search result dataset 324 or database object 331 directly from the data sources of the metadata 321, using the one or more data elements indicating the data source of the metadata 321. In other instances, monitoring computing device 105A may update, pull or obtain the most up to date version of the metadata 321 included in the corresponding search result dataset 324 or database object 331 from the data sources of the metadata 321, via database manager computing device 102. For instance, monitoring computing device 105A may transmit instructions to database manager computing device 102 to obtain the most up to date version of the metadata 321 included in the corresponding search result dataset 324 or database object 331. Database manager computing device 102 may execute update engine 310 to pull, fetch or update the metadata 321 included in the corresponding search result dataset 324 or database object 331 using the one or more data elements indicating the data source of the metadata 321. The corresponding search result dataset 324 or database object 331 may be stored in aggregated metadata database 320 or cache database 330 respectively. Aggregated metadata database 320 or cache database 330 may transmit the corresponding updated search result dataset 324 or database object 331 to monitoring computing device 105A.

In another example, database manager computing device 102 may initiate a query, data repository 116, that was previously made. As described herein, database manager computing device 102 may determine the query was previously made based on a comparison between one or more parameters of the query and one or more data elements of search result dataset 324 or database objects 331 stored in data repository 116 that characterize the query the corresponding search result dataset 324 or database object 331 is based off of. In response to determining the query was previously made, database manager computing device 102 may obtain the corresponding search result dataset 324 or database object 331. Additionally, the corresponding search result dataset 324 or database object 331 may be configured to trigger database manager computing device 102, to update, pull or obtain the most up to date version of the metadata 321 included in the search result dataset 324 or database object 331. For instance, database manager computing device 102 may execute update engine 310 to update, pull or obtain the most up to date version of the metadata 321 included in the search result dataset 324 or database object 331. As such, upon database manager computing device 102 obtaining the corresponding search result dataset 324 or database object 331, executed update engine 310 may update, pull or obtain the most up to date version of the metadata 321 included in the corresponding search result dataset 324 or database object 331. In some instances, executed update engine 310 may update, pull or obtain the most up to date version of the metadata 321 included in the corresponding search result dataset 324 or database object 331, based on the data elements that indicate the origins or data source of the metadata 321.

In various examples, monitoring computing device 105A may perform operations to generate and render for presentation a digital interface, such as an interactive, digital dashboard. The digital dashboard may have interface elements that identify one or more entities of one or more cloud database systems (e.g., cloud database system 103A, 103B, 103C) and/or one or more applications supported and maintained by the one or more cloud database systems, and their respective statuses. Additionally, the digital dashboards may provide a graphical representation of a current status of each of the one or entities or each of the one or more applications as well as historical data characterizing the status of each of the one or entities or each of the one or more applications over one or more prior temporal intervals. Moreover, the digital dashboards may, upon presentation by the computing system or device of an analyst, may provide a graphical representation characterizing the distribution of entities of each of the one or more cloud database systems, distribution of entities of each of the one or more cloud database systems over various geographical locations/regions, distribution of subscriptions within each of the one or more cloud database systems, distribution of subscriptions within each of the one or more cloud database systems over various geographical locations/regions, distribution of entities supporting each application supported by the one or more cloud database systems, and distribution of entities within various regions supporting each application supported by the one or more cloud database systems. Further, the digital dashboards may, upon presentation by the computing system or device of an analyst, also provide a graphical representation of network issues (e.g., hardware, switch, etc.) of one or more cloud database systems. The digital dashboard may enable an analyst to identify and troubleshoot, in real-time, issues associated with one or more entities of one or more cloud database system.

In some instances, monitoring computing device 105A may execute dashboard engine 404 to execute a dashboard application. Additionally, the dashboard application may generate the digital dashboard on a display of monitoring computing device 105A for an analyst. Moreover, executed dashboard engine 404 may obtain, from database manager computing device 102, a database object 331 or search result dataset 324 and/or one or more values of one or more metrics associated with the database object 331 or search result dataset 324. Based on the database object 331 or search result dataset 324 and/or one or more values of one or more metrics associated with the database object 331 or search result dataset 324, executed dashboard engine 404 may generate a dashboard notification. The dashboard notification may include metadata 321 of the search result dataset 324 or database object 331, one or more corresponding attributes, and/or one or more corresponding values of or more metrics. Further, executed dashboard engine 404 may transmit the dashboard notification to the dashboard application. The dashboard application may process the dashboard notification and generate the interface elements of the digital dashboard based on the dashboard notification (e.g., the aforementioned graphical representations, one or more display screens or windows of the digital dashboard).

In other instances, an analyst or operator may be operating another device, such as database manager computing device 102 or mobile computing device 110, 112, 114. In such instances, monitoring computing system 105, such as monitoring computing device 105A, may maintain, support and provide a dashboard application to such a device. Additionally, the dashboard application executing on the device of an analyst may generate the digital dashboard on a display of the device. For example, if the dashboard application is executing on database manager computing device 102, the digital dashboard may be displayed on display 216. In some instances, monitoring computing system 105, such as monitoring computing device 105A, may generate a dashboard notification based on a database object 331 or search result dataset 324 and/or one or more values of one or more metrics associated with the database object 331 or search result dataset 324. The dashboard notification may include metadata 321 of the search result dataset 324 or database object 331 the dashboard notification is generated for, one or more corresponding attributes, and/or one or more corresponding values of or more metrics. Additionally, monitoring computing system 105 may transmit the dashboard notification to the dashboard application executing on the device of the analyst. The dashboard application may process the dashboard notification and generate the interface elements of the digital dashboard based on the dashboard notification (e.g., the aforementioned graphical representations, one or more display screens or windows of the digital dashboard).

In various examples, an interactive digital dashboard may enable an analyst interacting with the interactive digital dashboard to query within various database objects 331 or search result datasets 324. For instance, the digital dashboard may include an interface element, such as a search bar that enables the analyst to query or search within a particular database object 331 or search result datasets 324. For example, monitoring computing device 105A (operated by the analyst) may present an interactive digital dashboard with interface elements associated with the distribution of virtual machines within various regions supporting a first application supported by cloud database system 103A and cloud database system 103B. Additionally, the interactive digital dashboard may include a search bar that enables the analyst to search within a database object 331 or search result dataset 324 associated with the distribution of virtual machines within various regions supporting a first application supported by cloud database system 103A and cloud database system 103B. For instance, the analyst may input various keyword search terms into the search bar to cause the interactive digital dashboard to present a corresponding search result that is based in part on the keyword search terms and the database object 331 or search result dataset 324.

In examples where the dashboard application is executing on monitoring computing device 105A, dashboard application may generate keyword data characterizing one or more keyword search terms that were inputted into the search bar by the analyst. In instances where the search result dataset 324 or the database object 331 is in tabular format, executed query engine 402 may compare each of the keyword search terms of the keyword data with each and every value in each and every column of each row of the database object 331 or search result dataset 324. Based on the comparison, executed query engine 402 may identify values that are a match (partial or full) and generate an additional dashboard notification including the identified values. Executed query engine 402 may transmit, to the dashboard application, the additional dashboard notification. The dashboard application may process the additional dashboard notification and generate and present on the digital dashboard search results based on the identified values of the additional dashboard notification.

In examples where the dashboard application is executing on another device, such mobile computing device 110, 112, 114, the dashboard application may transmit, to monitoring computing system 105, keyword data characterizing one or more keyword search terms that were inputted into the search bar by the analyst. In examples where the search result dataset 324 or the database object 331 is in tabular format, executed query engine 402 may compare each of the keyword search terms of the keyword data with each and every value in each and every column of each row of the database object 331 or search result dataset 324. Based on the comparison, executed query engine 402 may identify values that are a match (partial or full) and generate an additional dashboard notification including the identified values. Executed query engine 402 may transmit, to the dashboard application executing on the device of the analyst the additional dashboard notification. The dashboard application may process the additional dashboard notification and generate and present on the digital dashboard search results based on the identified values of the additional dashboard notification.

In some examples, to reduce the required computing resources and time to search for the identified values, the search result dataset 324 or database object 331 may be modified. For example, where the search result dataset 324 or database object 331 is in tabular format, database manager computing device 102 may execute data modifier engine 312. Executed data modifier engine 312 may add an additional column, such as a string representation column, to the search result dataset 324 or the database object 331. Additionally, for each row (that represents a particular entity), executed data modifier engine 312 may include in the added column a string representation of all the other values of all the other columns within the corresponding row. That way, when executed query engine 402 compares the keyword search terms of the keyword data, executed query engine 402 may compare the values included in the string representation in the string representation column of each row, instead of each and every value in each and every column of each row of the database object 331 or search result dataset 324.

For example, a dashboard application executing on monitoring computing device 105A generates a digital dashboard that provides a graphical representation characterizing the distribution of virtual machines supporting and maintaining a particular application over various regions and corresponding power status at a particular time. The virtual machines are associated with cloud database system 103A and cloud database system 103B and the graphical representation is based on a database object 331 stored in cache database 330. The database object 331 is in tabular format and includes a string representation column for each row. Additionally, the digital dashboard may include a search bar that enables the analyst to search within the database object 331. The analyst, via monitoring computing device 105A, inputs various keyword search terms related to one or more internet protocol (IP) addresses of interest. In response to the input, the dashboard application may generate keyword data characterizing one or more keyword search terms related to one or more internet protocol (IP) addresses of interest. Executed query engine 402 may obtain the keyword data and compares the keyword search terms of the keyword data with the values included in each string representation column of each row of the database object 331. Based on the comparison, executed query engine 402 may identify values that are a match (partial or full) and generate an additional dashboard notification including the identified values. Executed query engine 402 may transmit, to the dashboard application, the additional dashboard notification. The dashboard application may process the additional dashboard notification and generate and present on the digital dashboard search results based on the identified values of the additional dashboard notification (e.g., a graphical representation of the search results associated with the analysts input into the search bar).

METHODOLOGY

Figure 4:
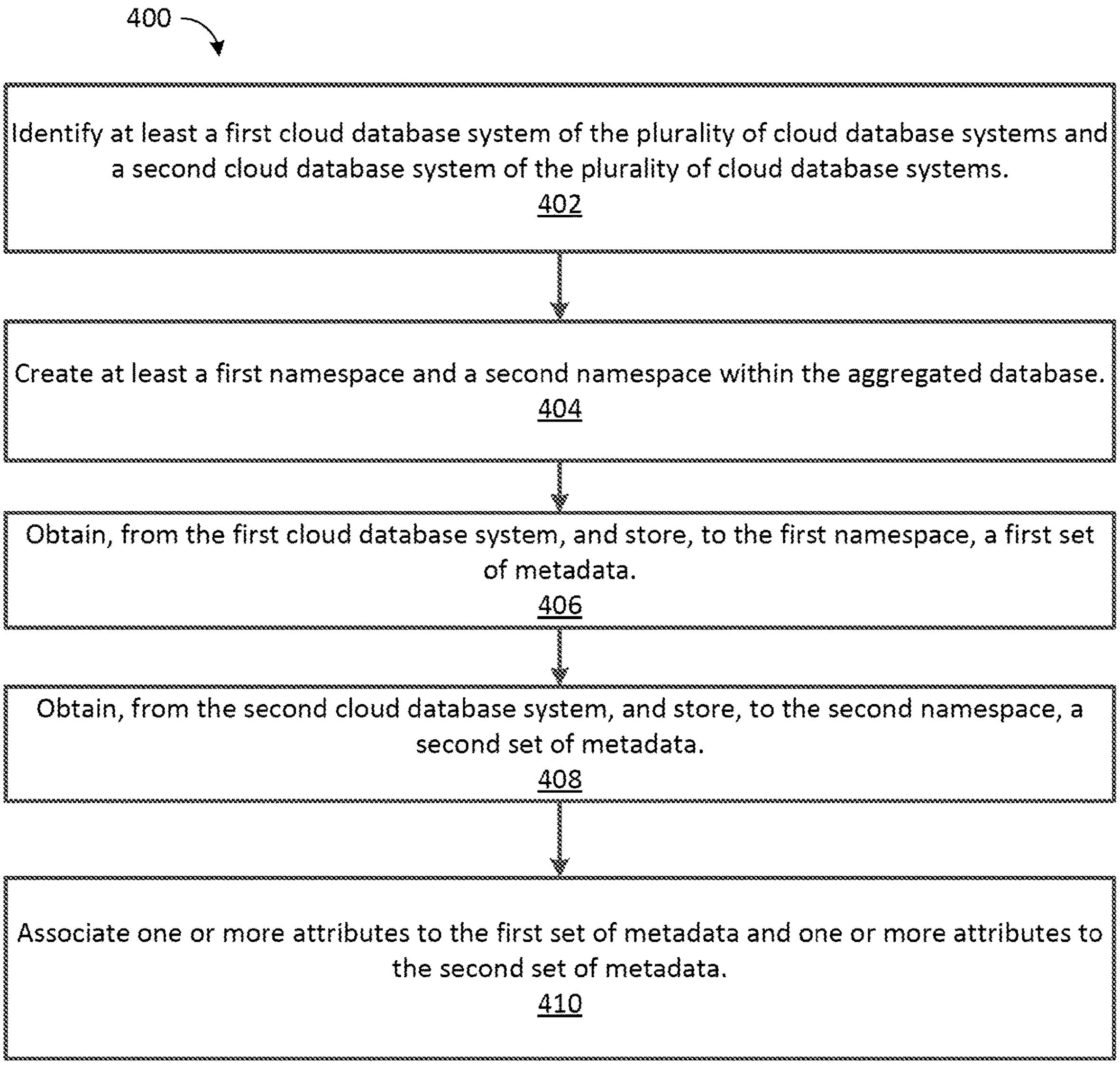
FIG. 4 illustrates an example method that can be carried out by the database manager computing device 102 of FIG. 1.
Figure 5:
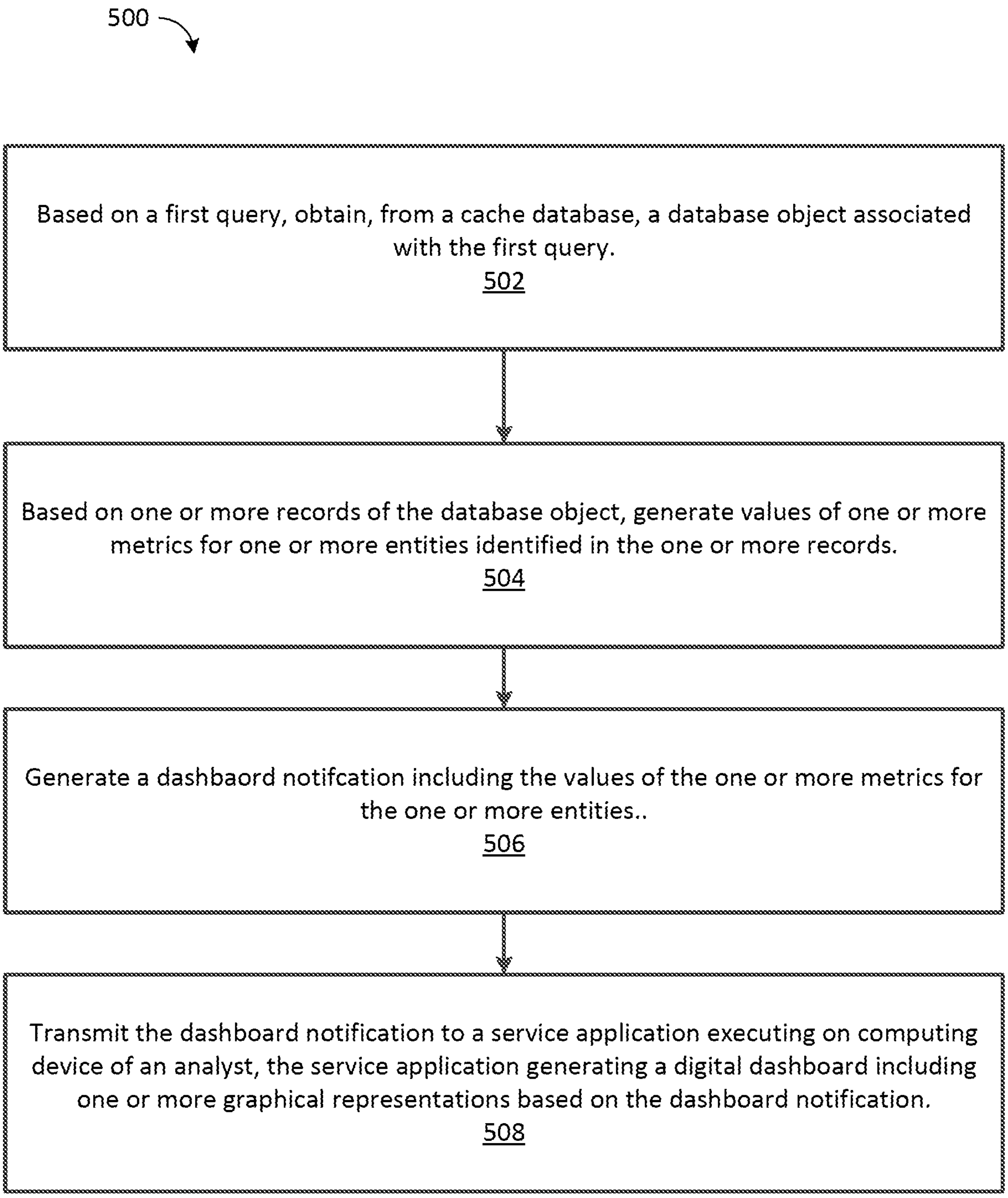
FIG. 5 illustrates an example method that can be carried out by the database manager computing device 102 of FIG. 1.
Figure 6:
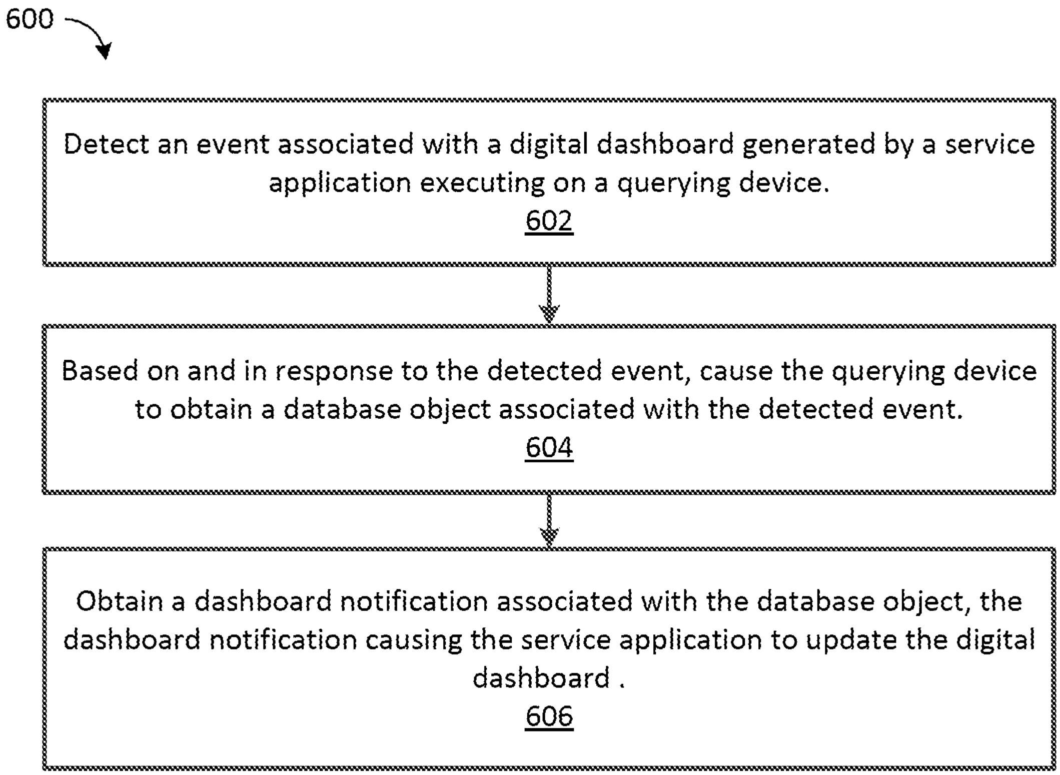
FIG. 6 illustrates an example method that can be carried out by the database manager computing device 102 of FIG. 1.

FIG. 4 illustrates an example method that can be carried out by the database manager computing device 102 of FIG. 1. FIG. 5 illustrates an example method that can be carried out by the database manager computing device 102 of FIG. 1. FIG. 6 illustrates an example method that can be carried out by the database manager computing device 102 of FIG. 1. In describing an example method of FIGS. 4, 5, and 6, reference is made to elements of FIGS. 1-3A and 3B for purpose of illustrating a suitable component for performing a step or sub-step being described.

With reference to example method 400 of FIG. 4, database manager computing device 102 may identify at least a first cloud database system of the plurality of cloud database systems and a second cloud database system of the plurality of cloud database systems (402). In some examples, executed data source identifier engine 302 may identify at least a first cloud database system of the plurality of cloud database systems and a second cloud database system of the plurality of cloud database systems. In other examples, executed data source identifier engine 302 may be a library, such as a foreign data wrapper (FDW), configured to identify cloud database systems (e.g., cloud database systems 103A, 103B, 103C) that database manager computing device 102 may communicate with and obtain one or more data elements of metadata 321.

Additionally, database manager computing device 102 may create at least a first namespace and a second namespace within the aggregated metadata database 320 (404). In some examples, the first namespace may be associated with the first cloud database system and the second namespace may be associated with the second cloud database system. In other examples, executed namespace engine 304 may generate or create, within aggregated metadata database 320, a uniquely identified namespace for each of the multiple cloud database systems, such as cloud database systems 103A, 103B, 103C, that executed data source identifier engine 302 pulls metadata 321 from. In various examples, executed data source identifier engine 302 may generate data identifying such cloud database systems. Additionally, executed namespace engine 304 may utilize such data to automatically generate corresponding namespaces within aggregated metadata database 320. In some examples, an analyst or operator operating database manager computing device 102 may instruct executed namespace engine 304 to generate namespaces for each cloud database system identified by executed data source identifier engine 302.

Moreover, database manager computing device 102 may obtain, from the first cloud database system, and store, to the first namespace, a first set of metadata 321 (406) and obtain, from the second cloud database system, and store, to the second namespace, a second set of metadata 321 (408). In some examples, executed data source identifier engine 302 may store obtained metadata 321 of a particular cloud database system into a uniquely identified namespace corresponding to the particular cloud database system. For example, executed namespace engine 304 may generate or create, within aggregated metadata database 320, the first namespace associated with the first cloud database system 103A and the second namespace associated with the second cloud database system 103B. Additionally, executed data source identifier engine 302 may store one or more elements of metadata 321 obtained from cloud database system 103A into the first namespace and one or more elements of metadata 321 obtained from cloud database system 103B into the second namespace.

In some examples, the one or more data elements of metadata 321 may include metadata schema 322 (e.g., schema information—the structure and organization) of the corresponding cloud database system (e.g. cloud database system 103A). Further, the one or more data elements of metadata 321 may be associated with entity information 323 regarding a particular entity (e.g., virtual machines, hypervisors, subnets, volumes, assigned IPs, projects, etc.) of the corresponding cloud database system (e.g., cloud database system 103B). Examples of the one or more data elements associated with entity information include at least the name of the corresponding entity, unique identifier 323A of the entity, creation timestamp 323B (e.g., time and/or date of creation), update timestamp 323C (e.g., time and/or date of latest update), power state 323D, entity state 323E, host name 323F, supporting entity name 323G (e.g., name of related entity the corresponding entity may be running on or being supported/maintained by, such as name of hypervisor that the corresponding entity, a virtual machine, is running off of), and owner identifier 323H.

In other examples, metadata 321 stored within aggregated metadata database 320 may be in a tabular format. For example, within a namespace associated with cloud database system 103B, metadata 321 may be in tabular format. Additionally, each row may identify a particular entity, and each column of each row may be associated with a particular data element. Examples of the one or more data elements include unique identifier 323A of the entity, creation timestamp 323B (e.g., time and/or date of creation), update timestamp 323C (e.g., time and/or date of latest update), power state 323D, entity state 323E, host name 323F, supporting entity name 323G (e.g., name of related entity the corresponding entity may be running on or being supported/maintained by, such as name of hypervisor that the corresponding entity, a virtual machine, is running off of), and owner identifier 323H.

In various examples, the cloud database system, such as cloud database systems 103A, 103B, 103C, may be configured to be public. In such examples, database manager computing device 102 may interrogate the relevant metadata APIs to obtain the relevant meta data. For example, for a particular virtual machine of cloud database system 103A, executed data source identifier engine 302 may directly submit metadata requests for the particular virtual machine to the relevant metadata APIs associated with the particular virtual machine. In response to the request, executed data source identifier engine 302 may obtain from each of the relevant metadata APIs the requested metadata 321 and store the requested metadata 321 in aggregated metadata database 320.

In other examples, the cloud database system, such as cloud database systems 103A, 103B, 103C, may be configured to be private. In such examples, database manager computing device 102 may obtain the relevant metadata 321 from the cloud database system using proper credentials (e.g., user name and password). For example, for a particular virtual machine of cloud database system 103B, executed data source identifier engine 302 may obtain the credentials to access database manager computing device 102. Additionally, for a particular virtual machine, executed data source identifier engine 302 may utilize the credentials to access cloud database system 103B and obtain metadata 321 associated with the particular virtual machine. Further, executed data source identifier engine 302 may store the metadata 321 associated with the particular virtual machine in aggregated metadata database 320.

Further, database manager computing device 102 may associate one or more attributes to the first set of metadata 321 and one or more attributes to the second set of metadata 321 (410). In some examples, executed attribute engine 306 may associate one or more attributes to the first set of metadata 321 and one or more attributes to the second set of metadata 321. In some instances, executed attribute engine 306 may associate one or more attributes to the first set of metadata 321 and one or more attributes to the second set of metadata 321 while executed data source identifier engine 302 obtains and stores the first set of metadata 321 into the first namespace and obtains and stores the second set of metadata 321 into the second namespace. Examples of the one or more attributes include an identifier of the namespace that the metadata 321 is being stored or placed into and geographic location or region of the database that supports or maintains the particular entity.

In some examples, database manager computing device 102 may leverage metadata 321 stored in aggregated metadata database 320 to obtain specified views or search result datasets 324. In such examples, database manager computing device 102 may execute query engine 308 to obtain the search result datasets 324. Additionally, executed query engine 308 may query, within aggregated metadata database 320, for the search result dataset 324. In some examples, the query may be for metadata 321 of one or more entities of one or more cloud database systems (e.g., cloud database system 103A, 103B, 103C). In other examples, the query may be for metadata 321 of one or more entities of one or more cloud database systems that support and maintain a particular application.

Additionally, based on the query, database manager computing device 102, may obtain the search result dataset 324 of metadata 321 (and associated attributes) associated with the query. In some instances, executed query engine 308 may generate a database object 331 of the search result dataset 324. Additionally, executed query engine 308 may store the database object 331 in cache database 330. In various instances, executed query engine 308 may store the search result dataset 324 in aggregated metadata database 320.

With reference to example method 500 of FIG. 5, monitoring computing device 105A may, based on a first query, obtain, from cache database 330, a database object 331 associated with the query (502). In some examples, executed query engine 402 may obtain, from cache database 330, a database object 331 associated with a particular query. In some instances, executed query engine 402 may query, cache database 330, for metadata 321 of one or more entities of one or more cloud database systems (e.g., cloud database system 103A, 103B, 103C) or metadata 321 of one or more entities of one or more cloud database systems that support and maintain a particular application. Based on the query, monitoring computing device 105A may obtain, from cache database 330, a database object 331 associated with the query. In some instances, executed query engine 402 may obtain a search result dataset 324 associated with the query from aggregated metadata database 320 based on the query, within aggregated metadata database 320.

In other examples, each search result dataset 324 or database object 331 may include a timestamp data indicating a time and date of creation and an update timestamp data indicating a time of date of the latest update. Additionally, each search result dataset 324 or database object 331 may be associated with a particular query. Moreover, each search result dataset 324 or database object 331 may store or link to multiple records. Each record may identify and characterize metadata 321 captured at a particular time and date as well as a timestamp indicating the time and date of capture. In some instances, each record may also include one or more attribute data associated with the corresponding captured metadata 321. Further, the update timestamp data of the search result dataset 324 or database object 331 may reflect the timestamp of the corresponding record with the most recently captured metadata 321.

Additionally, based on one or more records of the database object 331, monitoring computing device 105A may generate values of one or more metrics for one or more entities identified in the one or more records (504). In some examples, based on one or more records of the database object 331, executed query engine 402 may generate values of one or more metrics (e.g., power state, health state, etc.) for one or more entities identified in one or more records of the database object 331. In some instances, based on one or more records of the database object 331, executed query engine 402 may generate values of one or more metrics associated with one or more entities of the one or more of the multiple cloud database systems (e.g., cloud database system 103A, 103B, 103C). In other instances, based on one or more records of the database object 331, executed query engine 402 may generate values of one or more metrics on an aggregate basis across one or more geographic locations or regions during one or more intervals. In various instances, based on one or more records of the database object 331, executed query engine 402 may generate values of one or more metrics associated with one or more applications supported or maintained by the one or more of the multiple cloud database systems (e.g., entities of one or more of the multiple cloud database systems). Additionally, executed query engine 402 may generate the values of one or more metrics associated with one or more applications on an aggregated basis across one or more geographic locations or regions during one or more intervals.

Moreover, monitoring computing device 105A may generate a dashboard notification including the values of the one or more metrics for the one or more entities (506) and transmit the dashboard notification to a service application executing on computing device of an analyst (508). The service application may generate a digital dashboard including one or more graphical representations based on the dashboard notification. In some examples, executed dashboard engine 404 may generate the dashboard notification including the values of the one or more metrics for the one or more entities. Additionally, executed dashboard engine 404 may transmit the dashboard notification to a service application executing on a computing device of an analyst. In some examples, the computing device may be monitoring computing device 105A and the service application may be executing on monitoring computing device 105A. In other examples, the computing device may be mobile computing device 110, 112, 114. In such examples, the service application may be executing on mobile computing device 110, 112, 114.

In some examples, the digital dashboard may have interface elements that identify one or more entities of one or more cloud database systems (e.g., cloud database system 103A, 103B, 103C) and/or one or more applications supported and maintained by the one or more cloud database systems, and their respective statuses. Additionally, based on the dashboard notification, the digital dashboards may provide a graphical representation of a current status of each of the one or entities or each of the one or more applications as well as historical data characterizing the status of each of the one or entities or each of the one or more applications over one or more prior temporal intervals. Moreover, based on the dashboard notification, the digital dashboards may, upon presentation by the computing system or device of an analyst, may provide a graphical representation characterizing the distribution of entities of each of the one or more cloud database systems, distribution of entities of each of the one or more cloud database systems over various geographical locations/regions, distribution of subscriptions within each of the one or more cloud database systems, distribution of subscriptions within each of the one or more cloud database systems over various geographical locations/regions, distribution of entities supporting each application supported by the one or more cloud database systems, and distribution of entities within various regions supporting each application supported by the one or more cloud database systems. Further, the digital dashboards may, upon presentation by the computing system or device of an analyst, also provide a graphical representation of network issues (e.g., hardware, switch, etc.) of one or more cloud database systems. The digital dashboard may enable an analyst to identify and troubleshoot, in real-time, issues associated with one or more entities of one or more cloud database system.

With reference to example method 600 of FIG. 6, a service application may detect an event associated with a digital dashboard generated by the service application (602). In some examples, the service application, such as a dashboard application, may be executing on a querying device, such as monitoring computing device 105A or mobile computing device 110, 112, 114. In other examples, the service application, such as a dashboard application, may be executing on mobile computing device 110, 112, 114. In some examples, a detected event may be related to a user interacting with a particular graphical element or selectable feature included in the digital dashboard.

Additionally, based on and in response to the detected event, the service application may cause a querying device to obtain a database object 331 associated with the detected event (604). In examples, where the detected event is related to a user, such as an analyst, interacting with one of one or more selectable features of a digital dashboard, each selectable of one or more selectable features of the digital dashboard may be linked or associated with a particular search result dataset 324 stored in aggregated metadata database 320 or database object 331 stored in cache database 330. Additionally, the service application may detect when a user, such as an analyst, interacts with a particular selectable feature of the one or more selectable features. Moreover, in response to the service application detecting when the user interacts with the particular selectable feature, the service application may cause the querying device to obtain search result dataset 324 from aggregated metadata database 324 or database object 331 from cache database 331.

For example, a service application may be executing on a monitoring computing device 105A (or mobile computing device 110, 112, 114). The service application may generate a digital dashboard with a first selectable feature or interactive graphical element associated with or linked to a database object 331 that includes one or more records of metadata 321 (and associated attributes) of all the virtual machines of cloud database system 103A. Additionally, the digital dashboard may also include a second selectable feature or interactive graphical element associated with or linked to a database object 331 one or more records of metadata 321 (and associated attributes) of all the virtual machines of one or more cloud database systems 103A, 103B, 103C that support a particular application. Further, a user, such as an analyst, may interact with the first selectable feature. In response to and based on such an interaction, the service application may cause monitoring computing device 105A to obtain, from cache database 330 database object 331 associated with the first selectable feature.

Moreover, the service application may obtain a dashboard notification associated with the database object (606). In some examples, the dashboard notification may cause the service application to update the digital dashboard. In such examples, the updated digital dashboard may include one or more graphical features that are generated based on the dashboard notification. In other examples, the dashboard notification may be associated with the database object.

For example, following the example above, monitoring computing device 105A may obtain the database object 331. Additionally, executed query engine 402 may generate values of the power state associated with all the virtual machines of cloud database system 103A. Moreover, executed dashboard engine 404 may generate a dashboard notification based on the database object 331 (e.g., metadata 321 (and associated attributes) of all the virtual machines of cloud database system 103A) and/or the values of the one or more metric. Further, executed dashboard engine 404 may transmit the dashboard notification to the service application. Based on the dashboard notification, the service application may update the digital dashboard to include graphical representations and/or graphical elements of the power state of all the virtual machines of cloud database system 103A.

In examples, where the service application may be executing on another device, such as mobile computing device 110, 112, 114, the service application may generate a digital dashboard with a first selectable feature and second selectable feature. In such examples, the first selectable feature may be associated with or linked to a database object 331 that includes one or more records of metadata 321 (and associated attributes) of all the virtual machines of cloud database system 103B. Additionally, the second selectable feature may be associated with or linked to a database object 331 one or more records of metadata 321 (and associated attributes) of all the virtual machines of one or more cloud database systems 103A, 103B, 103C that support a particular application. Further, a user, such as an analyst, may interact with the second selectable feature. In response to and based on such an interaction, the service application may cause the mobile computing device to obtain, from cache database 330, the database object 331 associated with the second selectable feature. Additionally, the mobile computing device may transmit the database object 331 to monitoring computing device 105A. Moreover, executed query engine 402 may generate values of the health state associated with all the virtual machines of one or more of multiple cloud database system 103A, 103B, 103C that support and maintain the particular application. Moreover, executed dashboard engine 404 may generate a dashboard notification based on the database object 331 (e.g., metadata 321 of all the virtual machines of one or more cloud database systems 103A, 103B, 103C that support a particular application) and/or the values of the one or more metric. Further, executed dashboard engine 404 may transmit the dashboard notification to the service application executing on the mobile computing device. Based on the dashboard notification, the service application may update the digital dashboard to include graphical representations and/or graphical elements of the health state of each of the virtual machines of one or more cloud database system 103A, 103C, 103B that support and maintain the particular application.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:

a processor; and a non-transitory memory storing instructions that, when executed, cause the processor to:

create an aggregated metadata database by aggregating metadata of a plurality of cloud database systems including at least a first cloud database system and a second cloud database system, wherein each of the plurality of cloud database systems includes one or more virtual machines configured to execute applications;

receive identically named metadata originating from the first cloud database system and the second cloud database system, wherein the metadata include metadata schema information about a structure or organization of the first cloud database system and the second cloud database system;

create at least a first namespace that uniquely identifies the first cloud database system and a second namespace that uniquely identifies the second cloud database system within the aggregated metadata database;

store, to the first namespace, a first set of metadata of the identically named metadata originating from the first cloud database system;

store, to the second namespace, a second set of metadata of the identically named metadata originating from the second cloud database system;

associate a first set of one or more attributes to the first set of metadata and a second set of one or more attributes to the second set of metadata to generate a specified view of the aggregated metadata database using the metadata aggregated from the plurality of cloud database systems;

query, based on the first namespace and the second namespace, the specified view of the aggregated metadata database for metadata of at least one virtual machine associated with at least one of the first cloud database system or the second cloud database system;

generate a database object of the specified view of the aggregated metadata database, wherein the database object includes one or more data elements indicating a data source, within a corresponding cloud database system of the first cloud database system or the second cloud database system, of the database object;

store the database object in a cache database;

automatically and periodically update the database object stored in the cache database based on the data source within the corresponding cloud database system;

initiate another query of the aggregated metadata database for metadata of one or more virtual machines associated with at least the first cloud database system; and obtain the database object in response to determining a match between one or more parameters of the other query and the one or more data elements of the database object, wherein the determining includes comparing one or more parameters of the other query and the one or more data elements of the database object.

2. The system of claim 1, wherein the processor associates the first set of one or more attributes to the first set of metadata and the second set of one or more attributes to the second set of metadata, while the one or more processors obtain and store the first set of metadata into the first namespace and the second set of metadata into the second namespace.

3. The system of claim 1, wherein the processor executes the instructions further to:

initiate an additional query of the aggregated metadata database for metadata of one or more virtual machines associated with at least the first cloud database system; and obtain, from the aggregated metadata database, a search result dataset associated with the additional query.

4. The system of claim 1, wherein each of the plurality of cloud database systems includes one or more hypervisors, and the processor executes the instructions further to:

query, based on the first namespace and the second namespace, the aggregated metadata database for metadata of at least one hypervisor associated with at least one of the first cloud database system or the second cloud database system.

5. The system of claim 3, wherein the processor executes the instructions further to:

based on the search result dataset, generate a second database object associated with the additional query; and transmit, to a cache database system, the second database object.

6. The system of claim 5, wherein the second database object may include one or more records.

7. The system of claim 1, wherein the first cloud database system is a private cloud database system.

8. The system of claim 1, wherein the first cloud database system is a public cloud database system.

9. The system of claim 1, wherein the metadata includes metadata schema.

10. The system of claim 1, wherein the metadata is in tabular format and wherein the processor executes the instructions further to:

for each row, add a string representation column, the string representation column including values of each column within the corresponding row.

11. A computer-implemented method comprising:

creating an aggregated metadata database by aggregating metadata of a plurality of cloud database systems including at least a first cloud database system and a second cloud database system, wherein each of the plurality of cloud database systems includes one or more virtual machines configured to execute applications;

receiving identically named metadata originating from the first cloud database system and the second cloud database system, wherein the metadata include metadata schema information about a structure or organization of the first cloud database system and the second cloud database system;

creating at least a first namespace that uniquely identifies the first cloud database system and a second namespace that uniquely identifies the second cloud database system within the aggregated metadata database;

storing, to the first namespace, a first set of metadata of the identically named metadata originating from the first cloud database system;

storing, to the second namespace, a second set of metadata of the identically named metadata originating from the second cloud database system;

associating a first set of one or more attributes to the first set of metadata and a second set of one or more attributes to the second set of metadata to generate a specified view of the aggregated metadata database, and wherein the first set of one or more attributes includes an identifier of the first namespace that the first set of metadata is being stored or placed into and information related to a geographic location of hardware that supports or maintains the first cloud database system;

querying, based on the first namespace and the second namespace, the specified view of the aggregated metadata database for metadata of at least one virtual machine associated with at least one of the first cloud database system or the second cloud database system;

generating a database object of the specified view of the aggregated metadata database, wherein the database object includes one or more data elements indicating a data source, within a corresponding cloud database system of the first cloud database system or the second cloud database system, of the database object;

storing the database object in a cache database;

automatically and periodically updating the database object stored in the cache database based on the data source within the corresponding cloud database system;

initiating another query of the aggregated metadata database for metadata of one or more virtual machines associated with at least the first cloud database system; and obtaining the database object in response to determining a match between one or more parameters of the other query and the one or more data elements of the database object, wherein the determining includes comparing one or more parameters of the other query and the one or more data elements of the database object.

12. The computer-implemented method of claim 11, wherein associating the first set of one or more attributes to the first set of metadata and the second set of one or more attributes to the second set of metadata includes associating the one or more attributes to the first set of metadata and one or more attributes to the second set of metadata, while the first set of metadata is obtained and stored into the first namespace and the second set of metadata into the second namespace.

13. The computer-implemented method of claim 11, further comprising:

generating and transmitting, to the aggregated metadata database, an additional query associated with one or more virtual machines associated with at least the first cloud database system; and obtaining, from the aggregated metadata database, a search result dataset associated with the additional query.

14. The computer-implemented method of claim 11, wherein each of the plurality of cloud database systems includes one or more hypervisors, and the computer-implemented method further includes:

querying, based on the first namespace and the second namespace, the aggregated metadata database for metadata of at least one hypervisor associated with at least one of the first cloud database system or the second cloud database system.

15. The computer-implemented method of claim 13, further comprising:

based on the search result dataset, generating a second database object associated with the additional query; and transmitting, to a cache database system, the second database object.

16. The computer-implemented method of claim 15, wherein the second database object may include one or more records.

17. The computer-implemented method of claim 11, wherein the first cloud database system is a private cloud database system.

18. The computer-implemented method of claim 11, wherein the first cloud database system is a public cloud database system.

19. The computer-implemented method of claim 11, wherein the metadata is in tabular format and wherein the computer-implemented method further comprises:

for each row, adding a string representation column, the string representation column including values of each column within the corresponding row.

20. A non-transitory computer-readable medium storing instructions, that when executed by one or more processors, causes a computing system to:

create an aggregated metadata database by aggregating metadata of a plurality of cloud database systems including at least a first cloud database system and a second cloud database system, wherein each of the plurality of cloud database systems includes one or more virtual machines configured to execute applications;

receive identically named metadata originating from the first cloud database system and the second cloud database system, wherein the metadata include metadata schema information about a structure or organization of the first cloud database system and the second cloud database system;

create at least a first namespace that uniquely identifies the first cloud database system and a second namespace that uniquely identifies the second cloud database system within the aggregated metadata database;

store, to the first namespace, a first set of metadata of the identically named metadata originating from the first cloud database system;

store, to the second namespace, a second set of metadata of the identically named metadata originating from the second cloud database system;

associate a first set of one or more attributes to the first set of metadata and a second set of one or more attributes to the second set of metadata to generate a specified view of the aggregated metadata database, wherein the first set of metadata is stored in a tabular format and includes one or more of a unique identifier of the first cloud database system, a time and/or date of creation or latest update of metadata in the first set of metadata, a power state, or one or more names of a hypervisor that supports or maintains the first cloud database system;

query, based on the first namespace and the second namespace, the specified view of the aggregated metadata database for metadata of at least one virtual machine associated with at least one of the first cloud database system or the second cloud database system;

generate a database object of the specified view of the aggregated metadata database, wherein the database object includes one or more data elements indicating a data source, within a corresponding cloud database system of the first cloud database system or the second cloud database system, of the database object;

store the database object in a cache database; automatically and periodically update the database object stored in the cache database based on the data source within the corresponding cloud database system;

initiate another query of the aggregated metadata database for metadata of one or more virtual machines associated with at least the first cloud database system; and obtain the database object in response to determining a match between one or more parameters of the other query and the one or more data elements of the database object, wherein the determining includes comparing one or more parameters of the other query and the one or more data elements of the database object.

* * * * *